United States Patent
Tseng et al.

(10) Patent No.: US 9,811,689 B1
(45) Date of Patent: Nov. 7, 2017

(54) CHIP ID GENERATION USING PHYSICAL UNCLONABLE FUNCTION

(71) Applicant: MACRONIX INTERNATIONAL CO., LTD., Hsinchu (TW)

(72) Inventors: Po-Hao Tseng, Taichung (TW); Kai-Chieh Hsu, Taoyuan (TW); Feng-Min Lee, Hsinchu (TW); Yu-Yu Lin, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 15/391,062

(22) Filed: Dec. 27, 2016

(51) Int. Cl.
 *G11C 13/00* (2006.01)
 *G06F 3/06* (2006.01)
 (Continued)

(52) U.S. Cl.
 CPC ............. *G06F 21/73* (2013.01); *G06F 21/70* (2013.01); *G11C 11/417* (2013.01); *G11C 13/004* (2013.01); *G11C 13/0007* (2013.01); *G11C 13/0069* (2013.01); *H01L 27/2436* (2013.01); *H01L 45/08* (2013.01);
 (Continued)

(58) Field of Classification Search
 CPC ............ G11C 13/0069; G11C 13/0004; G11C 13/0007; G11C 11/5678; G11C 13/0002; G11C 2013/0083; G11C 11/5614; G11C 13/003; G11C 2213/78; G11C 11/5628; G11C 16/10; G11C 29/78; G11C 2013/0078; H01L 45/06; H01L 9/3278;
 (Continued)

(56) References Cited

U.S. PATENT DOCUMENTS 7,356,659 B2  4/2008 Kobayashi et al.
8,391,070 B2  3/2013 Bathul et al.
(Continued)

FOREIGN PATENT DOCUMENTS

WO   2015-134037 A1   9/2015

OTHER PUBLICATIONS

Herder et al. "Physical Unclonable Functions and Applications: A Tutorial," Proceedings of the IEEE | vol. 102, No. 8, Aug. 2014, pp. 1126-1141.
(Continued)

*Primary Examiner* — Vibol Tan
(74) *Attorney, Agent, or Firm* — Yiding Wu; Haynes Beffel & Wolfeld LLP

(57) ABSTRACT

A method for generating a data set on an integrated circuit including programmable resistance memory cells includes applying a forming pulse to all members of a set of the programmable resistance memory cells. The forming pulse has a forming pulse level characterized by inducing a change in resistance in a first subset of the set from an initial resistance range to an intermediate resistance range, while after the forming pulse a second subset of the set has a resistance outside the intermediate range. The method includes applying a programming pulse to the first and second subsets. The programming pulse has a programming pulse level characterized by inducing a change in resistance of the first subset from the intermediate range to a first final range, while after the programming pulse the second subset has a resistance in a second final range, whereby the first and second subsets store said data set.

19 Claims, 18 Drawing Sheets

(51) Int. Cl.
    *H01L 45/00*     (2006.01)
    *G06F 21/73*     (2013.01)
    *H04L 9/08*      (2006.01)
    *H01L 27/24*     (2006.01)
    *G11C 11/417*    (2006.01)
    *G06F 21/70*     (2013.01)
    *H04L 9/32*      (2006.01)

(52) U.S. Cl.
    CPC ........ *H01L 45/1233* (2013.01); *H04L 9/0866* (2013.01); *G11C 2013/0078* (2013.01); *H04L 9/3278* (2013.01)

(58) Field of Classification Search
    CPC .......... G06F 21/73; G06F 12/14; G06F 21/00; G06F 9/46
    See application file for complete search history.

(56) References Cited

U.S. PATENT DOCUMENTS

| | | | |
|---|---|---|---|
| 8,448,256 B2 | 5/2013 | Borchert et al. | |
| 8,694,856 B2* | 4/2014 | Tuyls | G06F 21/73 714/763 |
| 8,711,626 B2 | 4/2014 | Lee | |
| 8,819,409 B2 | 8/2014 | Kuipers et al. | |
| 8,971,527 B2 | 3/2015 | BrightSky et al. | |
| 8,995,169 B1* | 3/2015 | Bandyopadhyay | G11C 13/0069 365/148 |
| 9,001,554 B2* | 4/2015 | Hashim | H01L 45/08 365/148 |
| 9,071,446 B2* | 6/2015 | Kreft | G06F 21/71 |
| 9,082,514 B1* | 7/2015 | Trimberger | G11C 29/06 |
| 9,093,128 B2* | 7/2015 | Otterstedt | G11C 7/06 |
| 9,171,144 B2* | 10/2015 | Lewis | G06F 21/70 |
| 9,218,477 B2* | 12/2015 | Lewis | G06F 21/70 |
| 9,245,925 B1* | 1/2016 | Lee | H01L 27/2436 |
| 9,368,207 B2* | 6/2016 | Bandyopadhyay | G11C 13/0069 |
| 9,396,357 B2* | 7/2016 | Van Der Leest | H04L 9/0866 |
| 9,448,874 B2 | 9/2016 | Kim et al. | |
| 9,455,022 B2* | 9/2016 | Yabuuchi | G11C 11/417 |
| 9,455,403 B1* | 9/2016 | Lai | H01L 45/1233 |
| 9,461,826 B2* | 10/2016 | Kreft | G06F 21/71 |
| 9,536,581 B2* | 1/2017 | Katoh | G11C 13/0059 |
| 9,548,113 B2* | 1/2017 | Yoshimoto | G11C 13/004 |
| 9,588,908 B2* | 3/2017 | Cambou | G11C 11/005 |
| 9,646,178 B2* | 5/2017 | Kan | G06F 21/79 |
| 9,653,161 B2* | 5/2017 | Yoshimoto | G11C 13/004 |
| 2012/0179952 A1 | 7/2012 | Tuyls et al. | |
| 2014/0225639 A1 | 8/2014 | Guo et al. | |
| 2015/0055417 A1 | 2/2015 | Kim et al. | |
| 2015/0058928 A1 | 2/2015 | Guo et al. | |
| 2015/0169247 A1 | 6/2015 | Wang et al. | |
| 2015/0234751 A1 | 8/2015 | Van Der Sluis et al. | |
| 2015/0242158 A1 | 8/2015 | Hung et al. | |
| 2016/0093393 A1 | 3/2016 | Park et al. | |
| 2016/0148664 A1 | 5/2016 | Katoh et al. | |
| 2016/0148679 A1 | 5/2016 | Yoshimoto et al. | |
| 2016/0148680 A1 | 5/2016 | Yoshimoto et al. | |
| 2016/0156476 A1 | 6/2016 | Lee et al. | |
| 2016/0218146 A1 | 7/2016 | Lee et al. | |
| 2016/0284413 A1 | 9/2016 | Chang | |
| 2016/0364583 A1 | 12/2016 | Benoit et al. | |

OTHER PUBLICATIONS

Ruhrmair, et al. "PUFs at a Glance," Proceedings of the conference on Design, Automation & Test in Europe Article No. 347, Dresden, Germany—Mar. 24-28, 2014, 6 pages.

Yoshimoto, et al., "A ReRAM-based physically unclonable function with bit error rate < 0.5% after 10 years at 125° C. for 40nm embedded application," 2016 IEEE Symposium on VLSI Technology, Honolulu, HI, Jun. 14-16, 2016, pp. 1-2.

* cited by examiner

FIG. 5B: Low Resistance State

FIG. 5C: High Resistance State

CHIP ID GENERATION USING PHYSICAL UNCLONABLE FUNCTION

BACKGROUND

Field of the Technology

The present invention relates to integrated circuit devices having a data set generated using a physical unclonable function, and methods for generating such data set.

Description of Related Art

A physical unclonable function (PUF) is a process usable to create a unique, random key for a physical entity such as an integrated circuit. Use of a PUF is a solution for generating chip IDs supporting a hardware intrinsic security (HIS) technology. PUFs have been used for key creation in applications with high security requirements, such as mobile and embedded devices. An example PUF is a ring-oscillator PUF, that uses the manufacturing variability intrinsic to circuit propagation delay of gates. Another example PUF is an SRAM PUF, where threshold voltage differences in the transistors result in the SRAM powering up in either a logic "0" or logic "1".

It is desirable to provide a physical unclonable function for creating a data set in a programmable resistance memory with low bit error rates and high reliability under PVT (process, voltage, temperature) conditions.

SUMMARY

A method is provided for generating a data set on an integrated circuit including programmable resistance memory cells.

The method includes applying a forming pulse to all members of a set of the programmable resistance memory cells. The forming pulse has a forming pulse level characterized by inducing a change in resistance in a first subset of the set of programmable resistance memory cells from an initial resistance range to an intermediate resistance range, while after the forming pulse, a second subset of the set of programmable resistance memory cells has a resistance outside the intermediate range. Membership in the first and second subsets is determined by variations in physical response to the forming pulse across the set.

The method includes applying a programming pulse to the first and second subsets of programmable resistance memory cells. The programming pulse has a programming pulse level characterized by inducing a change in resistance of the first subset from the intermediate range to a first final resistance range. The programming pulse can make the distribution of cells in the first and second subsets for a given set of programmable resistance cell more stable in harsh environmental conditions. In embodiments described herein, the programming pulse can result in increasing a sensing margin between the cells in the first subset and the cells in the second subset. After the programming pulse, the cells in the second subset of programmable resistance memory cells can remain in a resistance range close to the initial resistance range, or otherwise have a resistance in a second final resistance range that does not overlap the first final resistance range. The first and second subsets of the set of programmable memory cells are established by the combination of the forming pulse and the programming pulse, and will vary according to variations in the programmable resistance memory cells that naturally result from the nature of the materials and the manufacturing processes.

The method can include, prior to applying the forming pulse, finding the forming pulse level by testing some of the programmable resistance memory cells on the integrated circuit.

To find the forming pulse level, a test pulse having a test pulse level can be iteratively applied to programmable resistance memory cells on the same integrated circuit, and preferably having the same structure as the memory cells to be used to create the unique data set. For each iteration, a different test set of the programmable resistance memory cells than previously used test set(s) can be used. A proportion of the memory cells in the test set can be determined that have resistance in the intermediate resistance range. If the proportion is less than a threshold, then the test pulse level can be updated repeating the operations to apply the test pulse and to determine the proportion until the determined proportion satisfies the threshold, or more preferably falls within a specified range around 50% (e.g. 40% to 60%), and the forming pulse level can be set based on the test pulse level in the iteration that satisfies the threshold or falls within the specified range.

The data set can be used to form a response to a challenge, such as in the example of security protocols. A method to use the data set includes sensing all or part of the data set using a read voltage for a resistance between the first and second final resistance ranges, and where the first and second final resistance ranges are separated by a read margin. As mentioned above, the read margin can be greater than a margin between the initial resistance range and the intermediate range.

The programmable resistance memory cells can comprise programmable resistance memory elements. In one embodiment, the programmable resistance memory elements can be characterized by an initial resistance in a high resistance range, where the intermediate resistance range is lower than the high resistance range, the first final resistance range is lower than the intermediate resistance range, and the second final resistance range is higher than the first final resistance range.

In another embodiment, the programmable resistance memory elements can be characterized by an initial resistance in a low resistance range, where the intermediate resistance range is higher than the low resistance range, the first final resistance range is higher than the intermediate resistance range, and the second final resistance range is lower than the first final resistance range.

Applying the forming pulse as described herein can result in formation of a conductive filament connecting first and second electrodes of memory cells in the first subset, and fail to result in formation of a conductive filament connecting first and second electrodes of memory cells in the second subset.

The programming pulse as described herein can stabilize and enhance conductivity of the conductive filament of memory cells in the first subset, and fail to result in formation of a conductive filament in memory cells in the second subset.

A method of manufacturing an integrated circuit in accordance with the method for generating a data set provided herein is also described.

An apparatus comprising an integrated circuit having a memory programmed using a PUF to create and store a unique data set is also described. The apparatus in this aspect of the technology, includes a controller configured to execute the PUF. The controller can include a state machine on the same integrated circuit as the memory, logic such as a computer program, on a separate system that can be placed in communication with the memory or a combination of on-chip and off-chip logic.

Other aspects and advantages of the present technology can be seen on review of the drawings, the detailed description and the claims, which follow.

BRIEF DESCRIPTION OF THE DRAWINGS

FIGS. 5A, 5B and 5C illustrate a conductive filament and a non-conductive filament in a programmable resistance memory cell.

DETAILED DESCRIPTION

Figure 1:
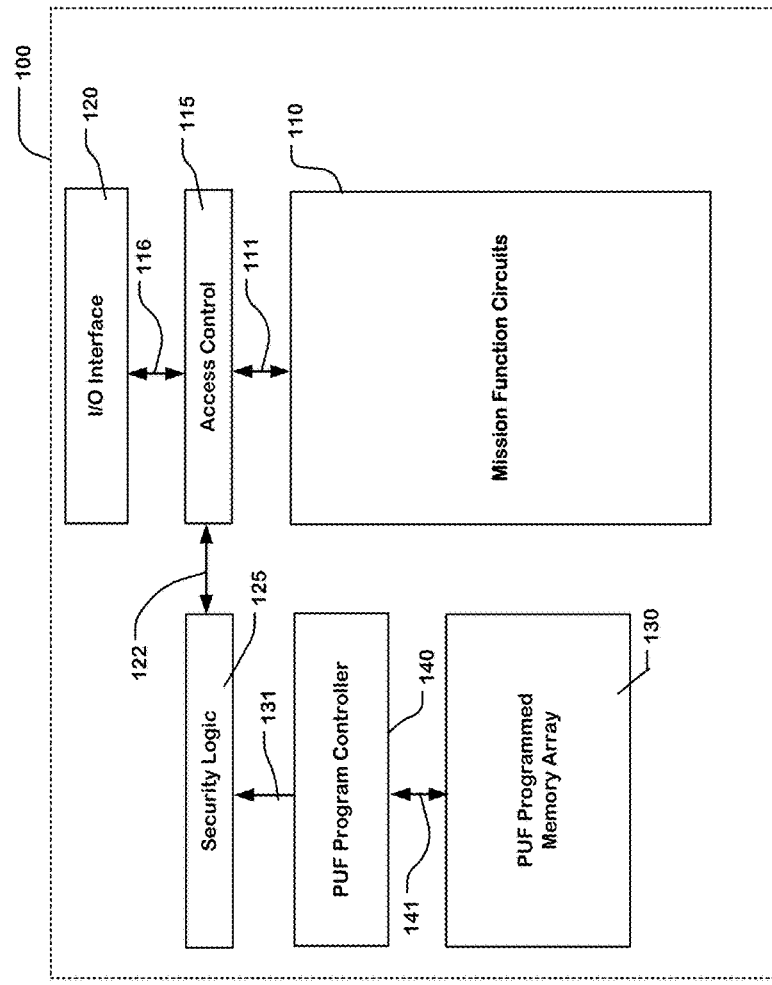
FIG. 1 is a simplified block diagram of an apparatus comprising an integrated circuit having a memory programmed using a PUF to create and store a unique data set.

A detailed description of embodiments of the present technology is provided with reference to the Figures. It is to be understood that there is no intention to limit the technology to the specifically disclosed structural embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows. Like elements in various embodiments are commonly referred to with like reference numerals.

FIG. 1 is a simplified block diagram of an apparatus comprising a plurality of programmable resistance memory cells, and a controller for executing a PUF to store a data set in the plurality of programmable resistance memory cells. In this example, the apparatus comprises an integrated circuit 100 having a memory formed using programmable resistance memory cells, the memory programmed using a PUF to create and store a unique data set, which can be used for example as a unique chip ID, a key for an authentication or encryption protocol, or other type of secret or unique data value.

The integrated circuit 100 includes mission function circuits 110, which can comprise special purpose logic sometimes referred to as application-specific integrated circuit logic, data processor resources such as used in microprocessors and digital signal processors, large-scale memory such as flash memory, DRAM memory, programmable resistance memory and combinations of various types of circuits known as system on a chip configurations. The integrated circuit 100 includes an input/output interface 120, which can comprise wireless or wired ports providing access to other devices or networks. In this simplified illustration, an access control block 115 is disposed between the input/output interface 120, and the mission function circuits 110. The access control block 115 is coupled by bus 116 to the input/output interface 120, and by bus 111 to the mission function circuits 110. An access control protocol is executed by the access control block 115 to enable or disable communications between the mission function circuits 110 and the input/output interface 120.

In support of the access control block 115, security logic 125 is disposed on the chip in this example. Security logic 125 is coupled to a PUF programmed memory array 130, which after execution of the PUF stores a unique data set. The unique data set is accessible on a bus 131 by the security logic 125 through a PUF program controller 140, and utilized by the security logic in communications across line 122 with the access control block 115.

The PUF programmed memory array 130 comprises programmable resistance memory cells, which include a programmable element having a programmable resistance. The programmable element can comprise a metal oxide such as tungsten oxide ($WO_x$), hafnium oxide ($HfO_x$), titanium oxide ($TiO_x$), tantalum oxide ($TaO_x$), titanium nitride oxide (TiNO), nickel oxide ($NiO_x$), ytterbium oxide ($YbO_x$), aluminum oxide ($AlO_x$), niobium oxide ($NbO_x$), zinc oxide ($ZnO_x$), copper oxide ($CuO_x$), vanadium oxide ($VO_x$), molybdenum oxide ($MoO_x$), ruthenium oxide ($RuO_x$), copper silicon oxide ($CuSiO_x$), silver zirconium oxide (AgZrO), aluminum nickel oxide (AlNiO), aluminum titanium oxide (AlTiO), gadolinium oxide ($GdO_x$), gallium oxide ($GaO_x$), zirconium oxide ($ZrO_x$), chromium doped $SrZrO_3$, chromium doped $SrTiO_3$, PCMO, or LaCaMnO, etc. In some cases, the programmable element of a memory cell can be a semiconductor oxide, such at silicon oxide ($SiO_x$).

In this example of the apparatus, the PUF program controller 140, implemented for example as a state machine on the integrated circuit with the plurality of programmable resistance memory cells, provides signals to control the application of bias arrangement supply voltages to carry out the PUF procedure and other operations involved in accessing the PUF programmed memory array 130 for the PUF and for reading the data set stored in the PUF programmed memory array 130. The controller 140 can be implemented using special-purpose logic circuitry as known in the art. In alternative embodiments, the controller 140 comprises a general-purpose processor, which can be implemented on the same integrated circuit, which executes a computer program to control the operations of the device. In yet other embodiments, a combination of special-purpose logic circuitry and a general-purpose processor can be utilized for implementation of the controller 140.

Figure 4:
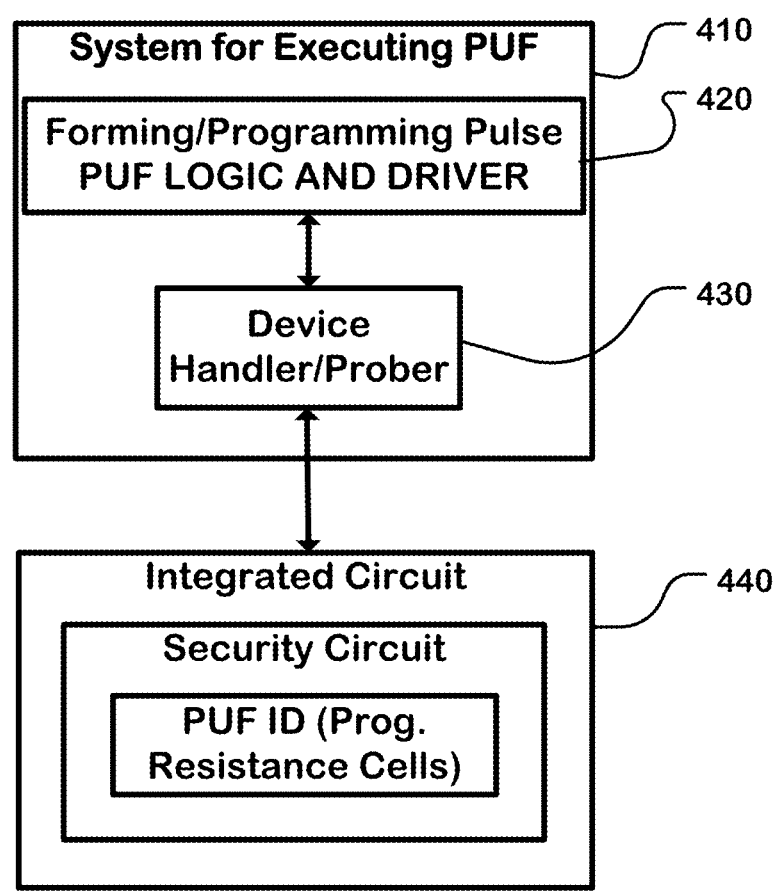
FIG. 4 illustrates an example system used for executing a physical unclonable function on an integrated circuit.

In one embodiment, an apparatus comprising an off-chip system (e.g. 410, FIG. 4) and an integrated circuit (e.g. 440, FIG. 4; 100, FIG. 1). The off chip system is used for controlling execution of a physical unclonable function on the integrated circuit. For instance, the off chip system can exercise a PUF program controller (e.g. 140, FIG. 1) on the integrated circuit to perform some of all of operations in applying the forming pulse, in applying the programming pulse, and in finding the forming pulse level. For instance, the system can communicate to the integrated circuit a resistance threshold, and the resistance threshold can be used in determining a forming pulse level. For instance, the system can communicate to the integrated circuit a forming pulse level, and the forming pulse level can be used in applying the forming pulse. For instance, the system can generate addresses for memory cells in test sets in the memory array in the integrated circuit for use in finding the forming pulse level, and communicate the addresses to an integrated circuit coupled to the system. In another embodiment, the PUF program controller 140 on the integrated circuit includes all the logic necessary to apply the forming pulse and the programming pulse, and to find the forming pulse level. In this embodiment, the PUF program controller 140 can execute the logic in response to a set up command from an external source, without control from a system used for executing a physical unclonable function on an integrated circuit.

The PUF program controller 140 is configured to apply a forming pulse to all members of a set of the programmable resistance memory cells in the PUF programmed memory array 130. The forming pulse has a forming pulse level characterized by inducing a change in resistance in a first subset of the set of memory cells from an initial resistance range to an intermediate resistance range, while after the forming pulse, a second subset of the set of programmable resistance memory cells has a resistance outside the intermediate range.

The PUF program controller 140 is configured to apply a programming pulse to the first and second subsets of programmable resistance memory cells. The programming pulse has a programming pulse level characterized by inducing a change in resistance of the first subset from the intermediate range to a first final resistance range. The programming pulse can result in increasing a sensing margin between the cells in the first subset and the cells in the second subset. After the programming pulse, the cells in the second subset of programmable resistance memory cells can remain in a resistance range close to the initial resistance range, or otherwise have a resistance in a second final resistance range that does not overlap the first final resistance range. The first and second subsets of the set of programmable memory cells are established by the combination of the forming pulse and the programming pulse, and will vary according to variations in the programmable resistance memory cells that naturally result from the nature of the materials and the manufacturing processes.

The PUF program controller 140 can be configured to, prior to applying the forming pulse, find the forming pulse level by testing some of the programmable resistance memory cells on the integrated circuit. The programmable resistance memory cells tested can be in test sets in the PUF programmed memory array 130. A test set of the programmable resistance memory cells is on the same integrated circuit as the memory cells to be used to create the unique data set. Test sets can be placed in a block of memory cells in the PUF programmed memory array 130 or at distributed locations in the PUF programmed memory array 130, or elsewhere on the device. In some embodiments, the test sets are part of or located adjacent to the PUF programmed memory array 130, and are formed using the same process as used to form the PUF circuit so that they can be used to predict behavior of the PUF circuit in response to the forming and programming processes described herein.

To find the forming pulse level, the PUF program controller 140 can be configured to iteratively apply a test pulse having a test pulse level to a test set in a plurality of test sets of the programmable resistance memory cells on the same integrated circuit, and determine a proportion of the memory cells in the test set that have resistance in the intermediate resistance range, and if the proportion is less than a threshold, then update the test pulse level repeating the operations to apply the test pulse and to determine the proportion until the determined proportion satisfies the threshold, and set the forming pulse level based on the test pulse level in the iteration that satisfies the threshold. For each iteration, a different test set of the programmable resistance memory cells than previously used test set(s) can be used.

The PUF program controller 140 can be configured to sense all or part of the data set in the programmed memory array 130 via the security circuit (e.g. 125, FIG. 1) using a read voltage for a resistance between the first and second final resistance ranges, where the first and second ranges are separated by a read margin, which is greater than a margin between the initial resistance range and the intermediate range.

The programmable resistance memory cells can comprise programmable resistance memory elements. In one embodiment, the programmable resistance memory elements can be characterized by an initial resistance in a high resistance range, where the intermediate resistance range is lower than the high resistance range, the first final resistance range is lower than the intermediate resistance range, and the second final resistance range is higher than the first final resistance range.

In another embodiment, the programmable resistance memory elements can be characterized by an initial resistance in a low resistance range, where the intermediate resistance range is higher than the low resistance range, the first final resistance range is higher than the intermediate resistance range, and the second final resistance range is lower than the first final resistance range.

Applying the forming pulse as described herein can result in formation of a conductive filament connecting first and second electrodes of memory cells in the first subset, and fail to result in formation of a conductive filament connecting first and second electrodes of memory cells in the second subset.

The programming pulse as described herein can stabilize and enhance conductivity of the conductive filament of memory cells in the first subset, and fail to result in formation of a conductive filament in memory cells in the second subset.

Figure 2:
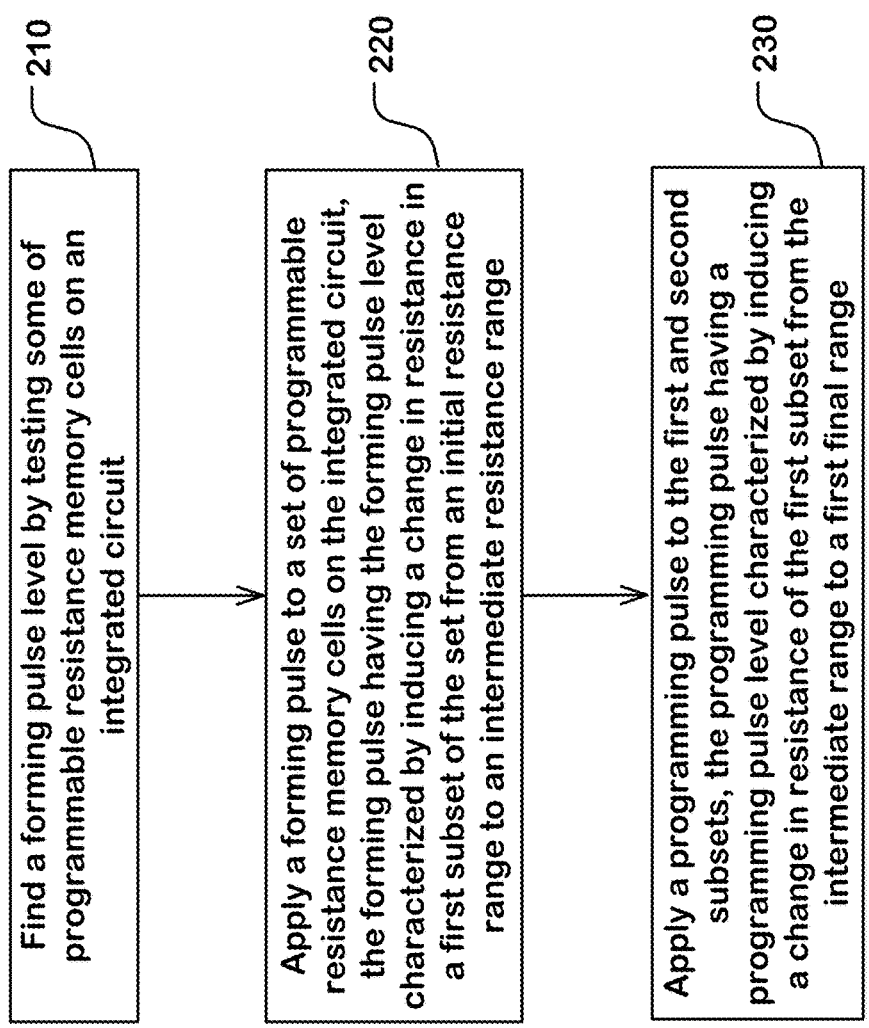
FIG. 2 shows an example flowchart for generating a data set on an integrated circuit including programmable resistance memory cells.

FIG. 2 shows an example flowchart for generating a data set on an integrated circuit including programmable resistance memory cells. At Step 210, a forming pulse level is found by testing some of the programmable resistance memory cells on the integrated circuit. This step is further described in connection to FIG. 3. At Step 220, a forming pulse is applied to a set of programmable resistance memory cells on the integrated circuit. The forming pulse has the forming pulse level found at Step 210. The forming pulse level is characterized by inducing a change in resistance in a first subset of the set of memory cells from an initial resistance range to an intermediate resistance range, while after the forming pulse, a second subset of the set of programmable resistance memory cells has a resistance outside the intermediate range. For instance, for a WOx (tungsten oxide) based programmable resistance memory that has initial resistance in a high resistance range, an initial resistance range can be between about 2700 KOhm and 3000 KOhm (FIG. 7A), an intermediate resistance range can be in a range below a threshold level of about 400 Kohm, and may be for example between about 100 KOhm and 400 KOhm (FIG. 7B), and a resistance of the second subset after the forming pulse outside the intermediate range can be a range that overlaps with the initial resistance range or otherwise remains at higher resistances than the intermediate resistance range. For example, the second subset can have resistances above a threshold level at about 2700 KOhm.

At Step 230, applying a programming pulse is applied to the first and second subsets of programmable resistance memory cells, which increases a read margin between cells in the first and second subsets. The programming pulse has a programming pulse level characterized by inducing a change in resistance of the first subset from the intermediate range to below a threshold level in a first final resistance range. The programming pulse can result in increasing a sensing margin between the cells in the first subset and the cells in the second subset. After the programming pulse, the cells in the second subset of programmable resistance memory cells can remain in a resistance range above a threshold level much greater than the maximum level of the first final resistance range, such as close to the initial resistance range, or otherwise have a resistance in a second final resistance range that does not overlap the first final resistance range. The first and second subsets of the set of programmable memory cells are established by the combination of the forming pulse and the programming pulse, and will vary according to variations in the programmable resistance memory cells that naturally result from the nature of the materials and the manufacturing processes. For instance, for a WOx (tungsten oxide) based programmable resistance memory that has initial resistance in a high resistance range (FIG. 7C), a first final resistance range can be between about 0 KOhm and 100 KOhm, and a second final resistance range can be between about 2700 KOhm and 3000 KOhm. The first and second final resistance ranges are separated by a read margin 745, which is greater than a margin 725 between the initial resistance range and the intermediate resistance ranges as shown, as described in connection to FIGS. 7B and 7C.

Figure 3:
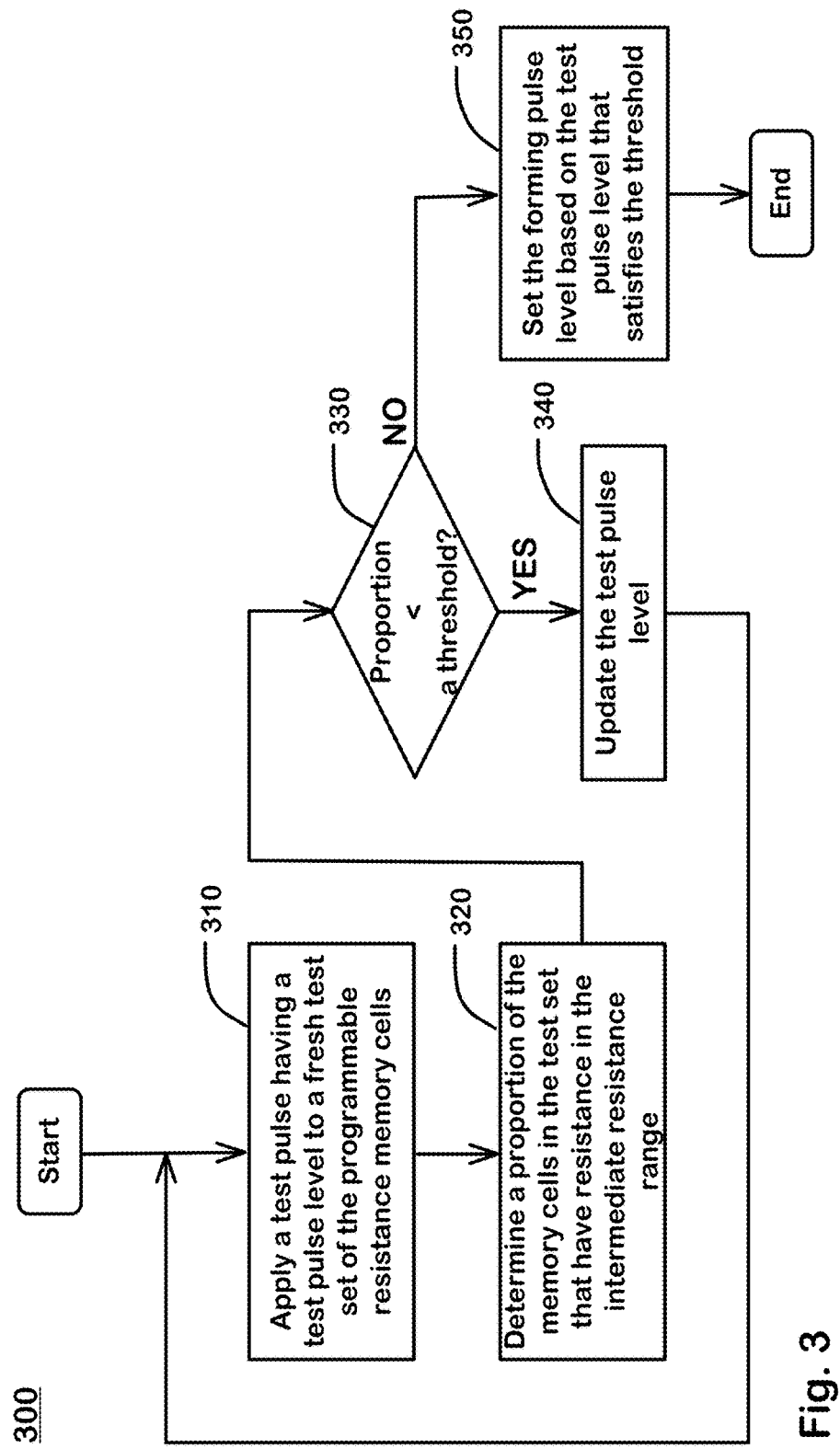
FIG. 3 shows an example flowchart for finding a forming pulse level.

FIG. 3 shows an example flowchart for finding a forming pulse level, corresponding to Step 210 in FIG. 2. At Step 310, a test pulse having a test pulse level is applied to a fresh test set of the programmable resistance memory cells. The test set has a smaller size than the set of the programmable resistance memory cells. For instance, the test set can have a size of 64 bits, while the set can have a size of 1000 bits. The test set can be in the PUF programmed memory array (e.g. 130, FIG. 1). For each iteration, a fresh test set is used. As used herein, a fresh test set is a different test set of the programmable resistance memory cells in the integrated circuit than any previously used test set(s). For purpose of finding a forming pulse level, multiple test sets are available on the integrated circuit, for example in the PUF programmed memory array 130 (FIG. 1). At Step 320, a proportion of the memory cells in the test set is determined that have resistance in the intermediate resistance range.

At Step 330, if the proportion is less than a threshold (e.g. 40 to 50%), then at Step 340, the test pulse level is updated, and Step 310 to apply a test pulse and Step 320 to determine a proportion are repeated until the determined proportion satisfies the threshold. When Step 310 and Step 320 are repeated, a fresh test set is used. A fresh test set is used for each iteration in finding the forming pulse level, so the forming pulse level can be determined using different test sets in the initial resistance range, for use with memory cells in the set of the programmable resistance memory cells in the same initial resistance range. A range of proportions of the memory cells in different test sets that have resistance in the intermediate resistance range can be determined, corresponding to updated test pulse levels. For instance, for a WOx (tungsten oxide) based programmable resistance memory that has initial resistance in a high resistance range (FIGS. 9-13), proportions of the memory cells in different test sets that have resistance in the intermediate resistance range have a range between 8% and 90%, corresponding to updated test pulse levels corresponding to different word line voltages and bit line voltages applied on respective test sets.

Figure 11:
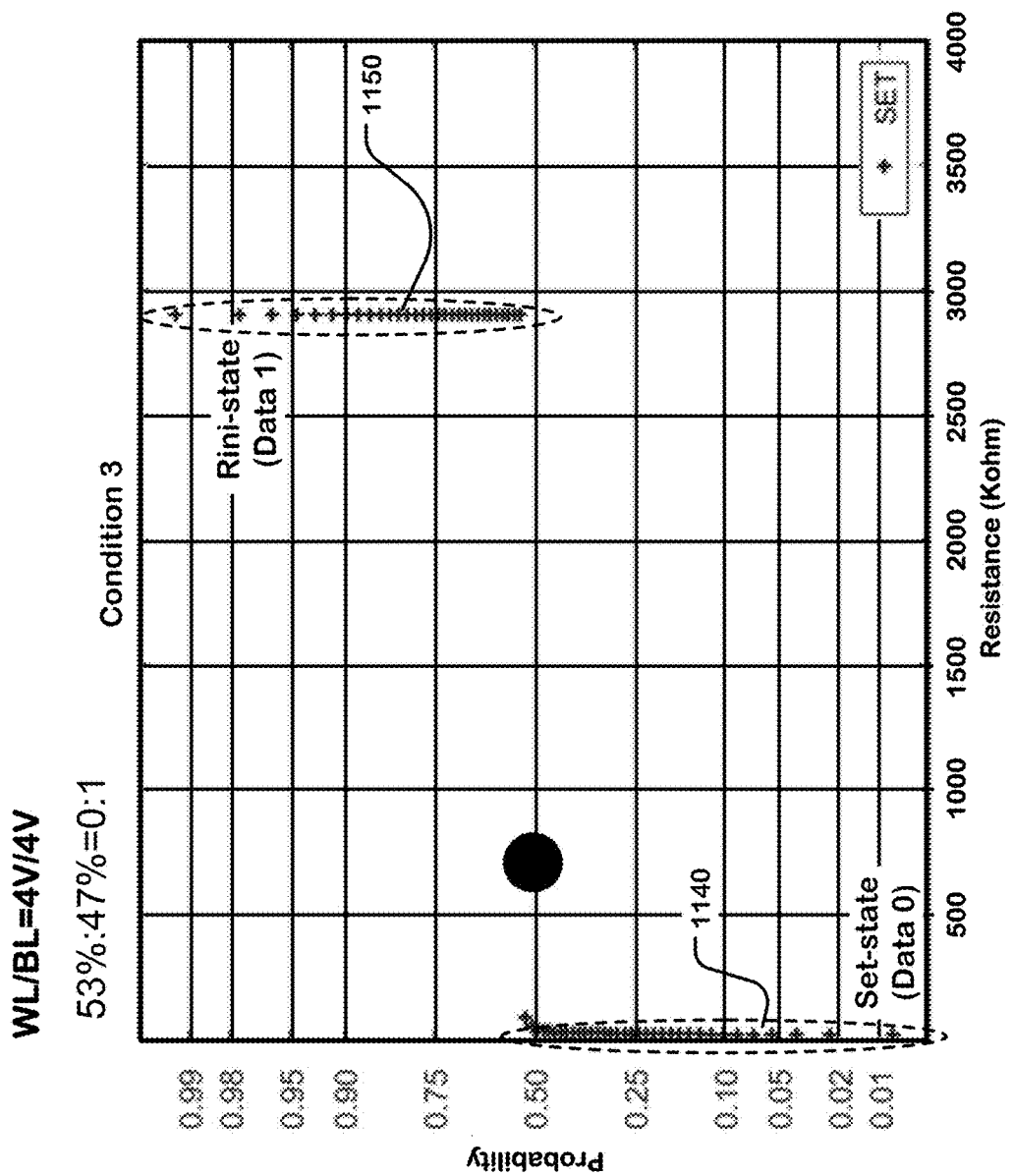

At Step 350, the forming pulse level is set based on the test pulse level in the iteration that satisfies the threshold. Steps 310, 320, 330, 340 and 350 can be executed by the PUF program controller 140 as described in connection to the integrated circuit 100 shown in FIG. 1. The forming pulse level can be based on a particular test pulse level used for a particular iteration that results in a proportion that is closer to the threshold than other proportions in the range of proportions of the memory cells in different test sets that have resistance in the intermediate resistance range. For instance, if the threshold is 50%, then the forming pulse level can set based on the test pulse level in the iteration that results in 53% of the memory cells that have resistance in the intermediate resistance range (FIG. 11).

The procedures of FIGS. 2 and 3 can be part of a process for manufacturing an integrated circuit, which comprises forming a plurality of programmable resistance memory cells on the integrated circuit; connecting the integrated circuit to a system configured to apply a physical unclonable function to programmable resistance memory cells on the integrated circuit, and using the system, to generate a data set in a set of programmable resistance memory cells in the plurality of programmable resistance memory cells, by the process described herein. One example, among many known in the art, of a manufacturing process including forming a plurality of programmable resistance cells is shown in Lee et al., U.S. Patent Application Publication No. US 2016/0218146, entitled RRAM PROCESS WITH ROUGHNESS TUNING TECHNOLOGY, which is incorporated by reference as if fully set forth herein.

FIG. 4 illustrates an example system used for executing a physical unclonable function on an integrated circuit. A plurality of programmable resistance memory cells is formed on the integrated circuit. The integrated circuit is connected to the system which is configured to apply a physical unclonable function to programmable resistance memory cells on the integrated circuit. Using the system, a data set can be generated in a set of programmable resistance memory cells in the plurality of programmable resistance memory cells on the integrated circuit. The system can use a method such as described in connection to the flowcharts in FIGS. 2 and 3.

The method used by the system can include applying a forming pulse to all members of the set, where the forming pulse has a forming pulse level characterized by inducing a change in resistance in a first subset of the set of programmable resistance memory cells from an initial resistance range to an intermediate resistance range, while after the forming pulse a second subset of the set of programmable resistance memory cells has a resistance outside the intermediate range.

The method used by the system can include applying a programming pulse to the first and second subsets of programmable resistance memory cells, where the programming pulse has a programming pulse level characterized by inducing a change in resistance of the first subset from the intermediate range to a first final resistance range. The programming pulse can result in increasing a sensing margin between the cells in the first subset and the cells in the second subset. After the programming pulse, the cells in the second subset of programmable resistance memory cells can remain in a resistance range close to the initial resistance range, or otherwise have a resistance in a second final resistance range that does not overlap the first final resistance range. The first and second subsets of the set of programmable memory cells are established by the combination of the forming pulse and the programming pulse, and will vary according to variations in the programmable resistance memory cells that naturally result from the nature of the materials and the manufacturing processes. The method used by the system can include prior to applying the forming pulse, finding the forming pulse level by testing different test sets of the programmable resistance memory cells on the integrated circuit.

An example system used for executing a physical unclonable function on an integrated circuit can include multiple device testers, multiple device probers, multiple device handlers, and multiple interface test adapters. A device tester may interact with a device prober to test integrated circuit die in wafer form. A device tester may also interact with a device handler to test packaged integrated circuits. As shown in FIG. 4, an example system 410 includes PUF LOGIC and Driver 420, and a device handler/prober 430 coupled to the device tester 420. An integrated circuit 440 to be subjected to the PUF LOGIC and Driver 420 is coupled to the device handler/prober 430. The integrated circuit 440 includes a security circuit. A PUF ID circuit in the security circuit includes first and second subsets of the set of programmable resistance memory cells established by the combination of the forming pulse and the programming pulse applied by the system.

An example integrated circuit in the system 410 may be an integrated circuit 100, as described with reference to FIG. 1. During manufacturing of the integrated circuit 100, the system 410 performs the actions identified in the flowcharts in FIGS. 2 and 3.

Figure 5A:
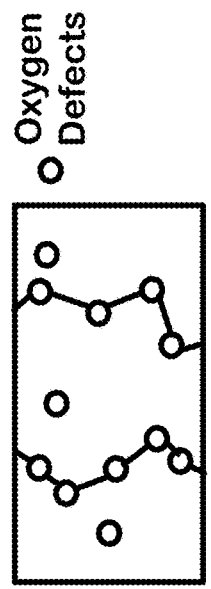
Figure 5A:
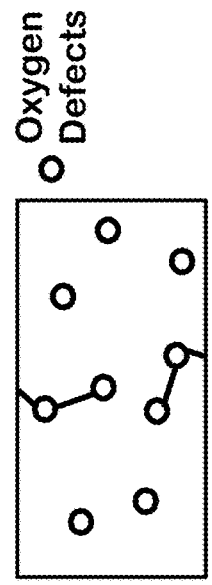
Figure 5A:
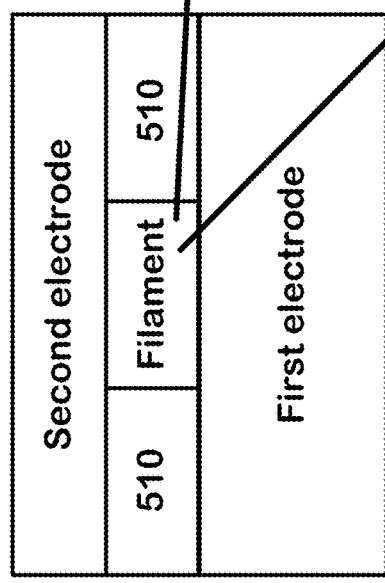

FIGS. 5A, 5B and 5C illustrate a conductive filament and a non-conductive filament in a programmable resistance memory cell. FIG. 5A illustrates a programmable resistance memory cell. A programmable resistance memory cell 500 includes a first electrode, a second electrode, and a programmable metal oxide memory element 510 between the first and second electrode. A forming pulse can have a voltage high enough to generate a conductive portion in the programmable metal oxide memory element of the memory cell. In some metal oxide memory materials, the conductive portion can comprise oxygen vacancies induced by electric fields across the material, and aligned to provide a conductive path. A forming pulse applied to memory cells such as the memory cell 500 in the first and second subsets of the set of memory cells can result in formation of a conductive filament connecting first and second electrodes of memory cells in the first subset, and fail to result in formation of a conductive filament connecting first and second electrodes of memory cells in the second subset. Consequently, memory cells in the first subset can be in a low resistance state, while memory cells in the second subset can be in a high resistance state. The low and high resistance states can be utilized to indicate a logic "1" or "0" in the data set.

The programming pulse applied to the first and second subsets of programmable resistance memory cells after the forming pulse can stabilize and enhance conductivity of the conductive filament of memory cells in the first subset, and fail to result in formation of a conductive filament in memory cells in the second subset.

FIG. 5B illustrates an example conductive filament connecting first and second electrodes of a memory cell in the first subset, via two conductive paths formed of oxygen vacancies in the metal oxide memory element. FIG. 5C illustrates an example non-conductive filament where oxygen vacancies fail to form a path connecting first and second electrodes of the memory cell in the second subset. Although FIGS. 5A, 5B and 5C illustrate a programmable resistance memory cell including a programmable metal oxide memory element, the technology described herein can be applied to other types of programmable resistance memory materials.

Figure 6B:
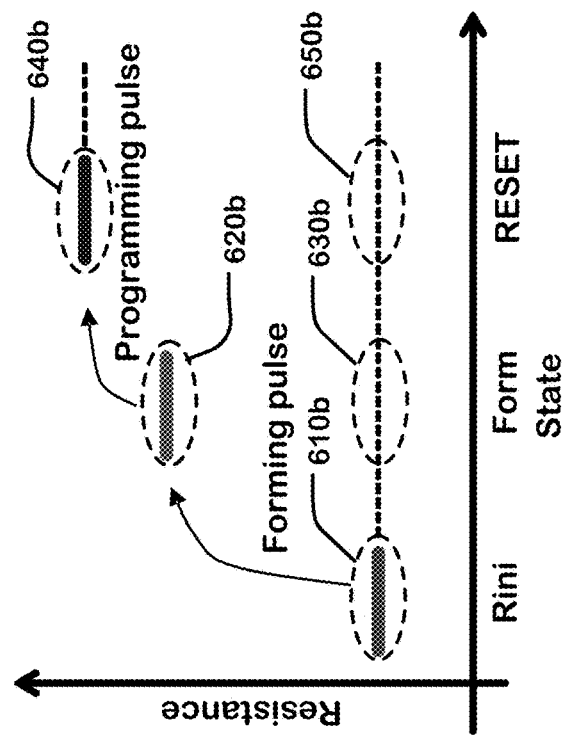
FIGS. 6A and 6B illustrate resistance ranges in operations to generate a data set.
Figure 6A:
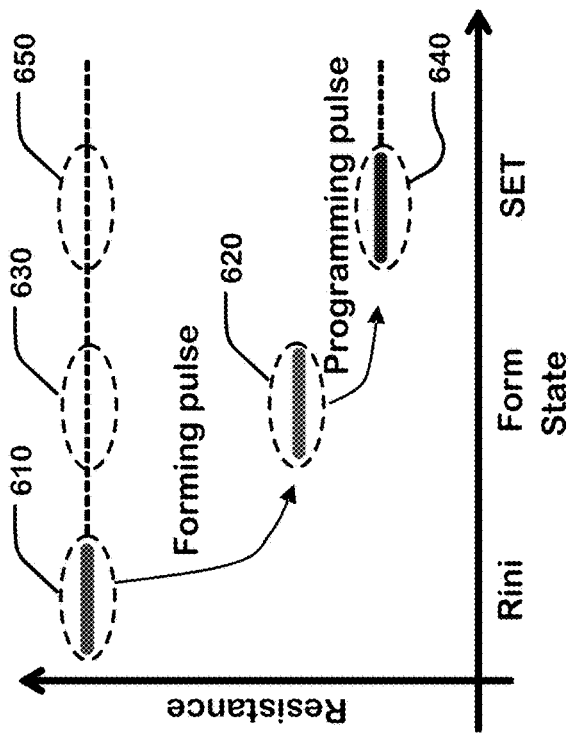

FIGS. 6A and 6B illustrate resistance ranges in operations to generate a data set. Before a forming pulse having a forming pulse level is applied to a set of the programmable resistance memory cells, all members of the set are in an initial resistance range (e.g. 610, 610b). After the forming pulse is applied to the set, resistance in a first subset of the set of the programmable resistance memory cells is changed to an intermediate resistance range (e.g. 620, 620b), while a second subset of the set of programmable resistance memory cells has a resistance outside the intermediate range (e.g. 630, 630b). After the programming pulse is applied to the set, resistance of the first subset is changed from the intermediate range to a first final resistance range (e.g. 640, 640b), while the second subset of programmable resistance memory cells has a resistance in a second final resistance range (e.g. 650, 650b) that does not overlap the first final resistance range.

In one embodiment as shown in FIG. 6A, the initial resistance range (e.g. 610) is a high resistance range, the intermediate resistance range (e.g. 620) is lower than the initial resistance range (e.g. 610), the first final resistance range (e.g. 640) is lower than the intermediate resistance range (e.g. 620), and the second final resistance range (e.g. 650) is higher than the first final resistance range (e.g. 640). The programming pulse in this embodiment is referred to as a set pulse. The set pulse has a voltage high enough to reconnect conductive paths in filaments in the programmable resistance memory elements in the first subset of the set of memory cells, so that the programmable memory elements are in a low resistance state. Filaments are further described in connection with FIGS. 5A, 5B and 5C. This embodiment is suitable for technologies where memory cells have initial resistance in a high resistance range and are then formed to a lower intermediate range, such as a WOx based programmable resistance memory manufactured with an oxidation process that results in initially high resistance.

In another embodiment as shown in FIG. 6B, the initial resistance range (e.g. 610b) is a low resistance range, the intermediate resistance range (e.g. 620b) is higher than the initial resistance range (e.g. 610b), the first final resistance range (e.g. 640b) is higher than the intermediate resistance range, and the second final resistance range (e.g. 650b) is lower than the first final resistance range (e.g. 640b). The programming pulse in this embodiment is referred to as a reset pulse. The reset pulse has a voltage high enough to break conductive paths in filaments in the programmable resistance memory elements in the first subset of the set of memory cells, so that the programmable resistance memory elements are in a high resistance state. Filaments are further described in connection with FIGS. 5A, 5B and 5C. This embodiment is suitable for technologies where memory cells have initial resistance in a low resistance range and are then formed to a higher intermediate range, such as a WOx based programmable resistance memory manufactured with a different oxidation process that results in initially low resistance.

Figure 7A:
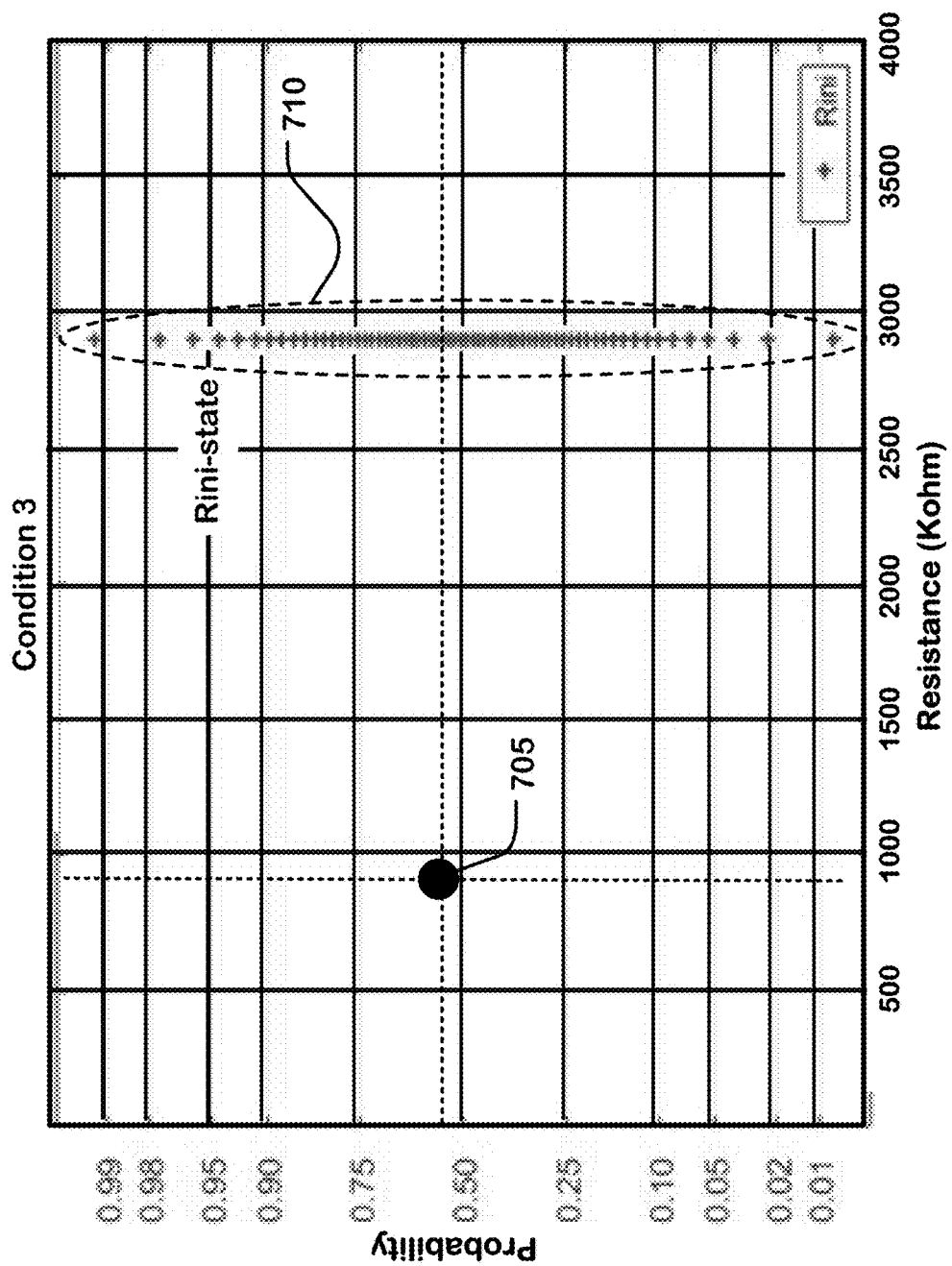
FIGS. 7A, 7B and 7C illustrate probability charts for resistance of memory cells at different stages of a PUF process as described herein.
Figure 7B:
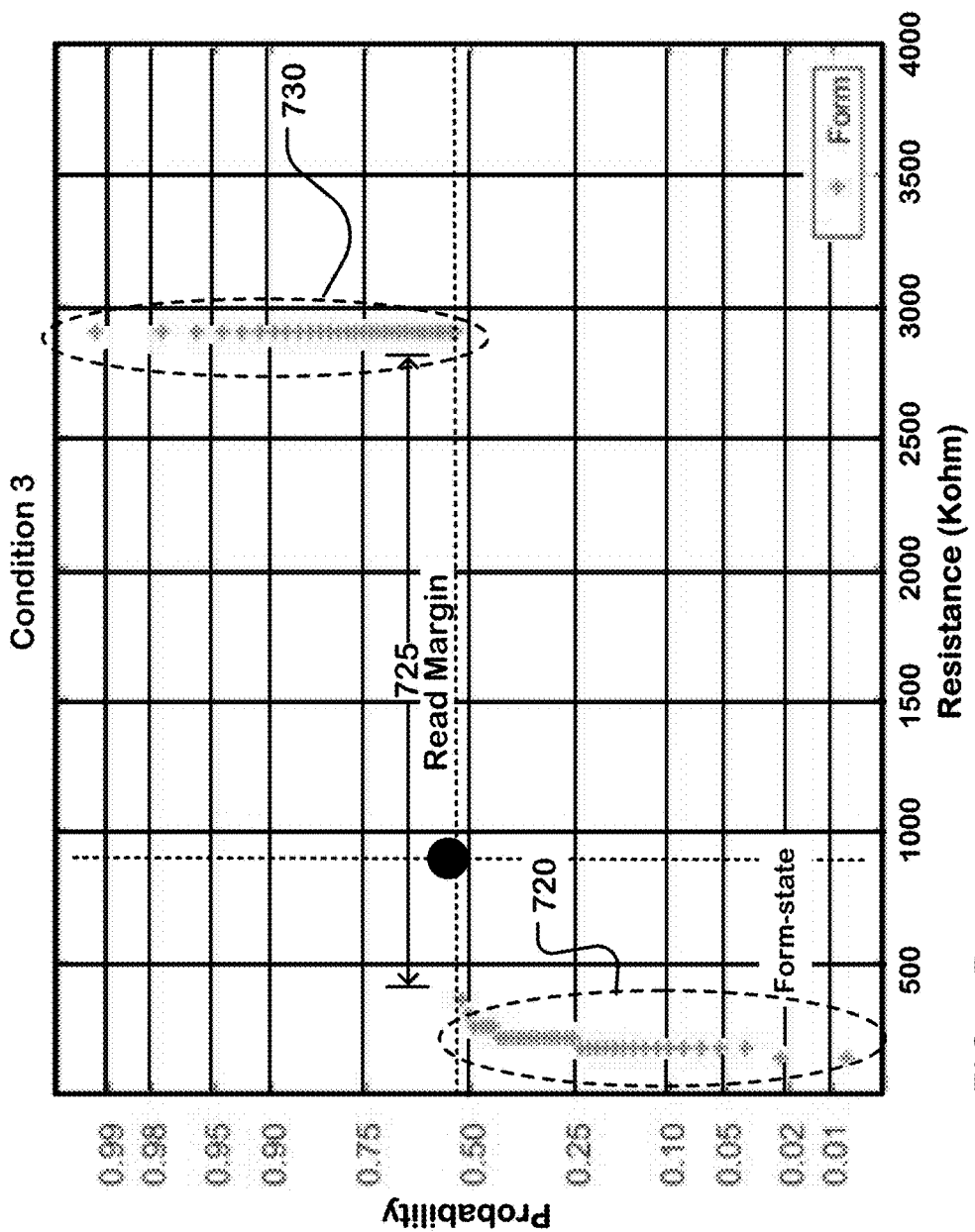
Figure 7C:
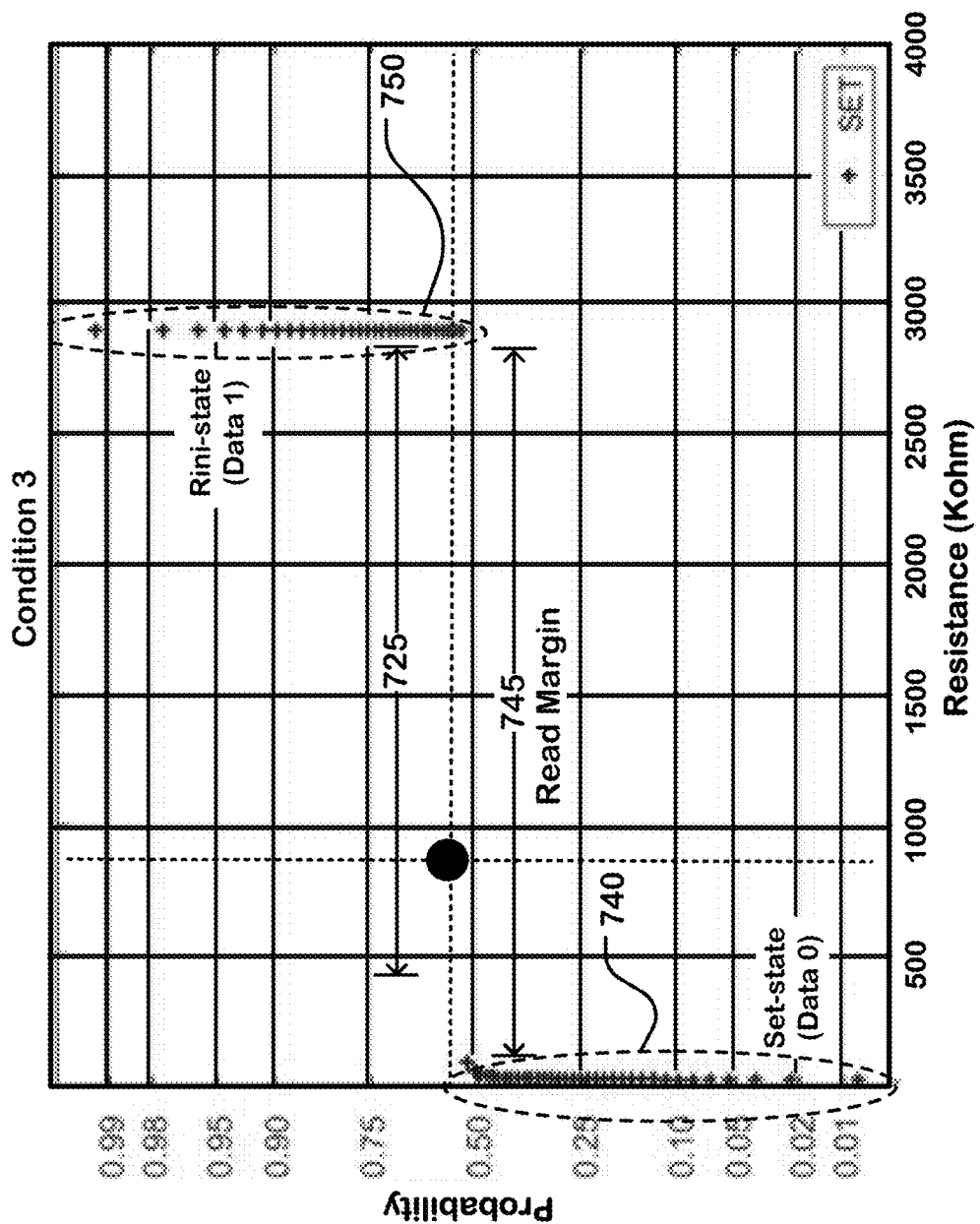

FIGS. 7A, 7B and 7C are probability charts for resistance of memory cells at different stages of a PUF process as described herein. FIG. 7A illustrates that, before a forming pulse having a forming pulse level is applied to a set of the programmable resistance memory cells, all members of the set are in an initial resistance range for example between about 2700 KOhm and 3000 KOhm (e.g. 710).

FIG. 7B illustrates results after applying a forming pulse to all members of a set of the programmable resistance memory cells. The forming pulse has a forming pulse level characterized by inducing a change in resistance in a first subset of the set of programmable resistance memory cells from an initial resistance range to an intermediate resistance range, for example between about 100 KOhm and 400 KOhm (e.g. 720), while after the forming pulse, a second subset of the set of programmable resistance memory cells has a resistance outside the intermediate range. Membership in the first and second subsets is determined by variations in physical response to the forming pulse across the set. The initial and intermediate resistance ranges are separated by a read margin 725. A forming pulse level used by the forming pulse and a resistance threshold 705 used in determining the forming pulse level are described in connection to FIGS. 9-13.

FIG. 7C illustrates results after applying a programming pulse to the first and second subsets of programmable resistance memory cells. The programming pulse has a programming pulse level characterized by inducing a change in resistance of the first subset from the intermediate range to a first final resistance range, for example between about 0 KOhm and 100 KOhm (e.g. 740). The programming pulse can result in increasing a sensing margin between the cells in the first subset and the cells in the second subset. After the programming pulse, the cells in the second subset of programmable resistance memory cells can remain in a resistance range close to the initial resistance range, or otherwise have a resistance in a second final resistance range (e.g. 750) that does not overlap the first final resistance range. The first and second subsets of the set of programmable memory cells are established by the combination of the forming pulse and the programming pulse, and will vary according to variations in the programmable resistance memory cells that naturally result from the nature of the materials and the manufacturing processes. The first and second final resistance ranges are separated by a read margin 745, which is greater than a margin 725 between the initial resistance range and the intermediate resistance ranges as shown in FIG. 7B. Such a read margin can be wide enough to ensure reliability of the first and second subsets of the programmable resistance memory cells that store the data set under PVT (process, voltage, temperature) variations.

Figure 8:
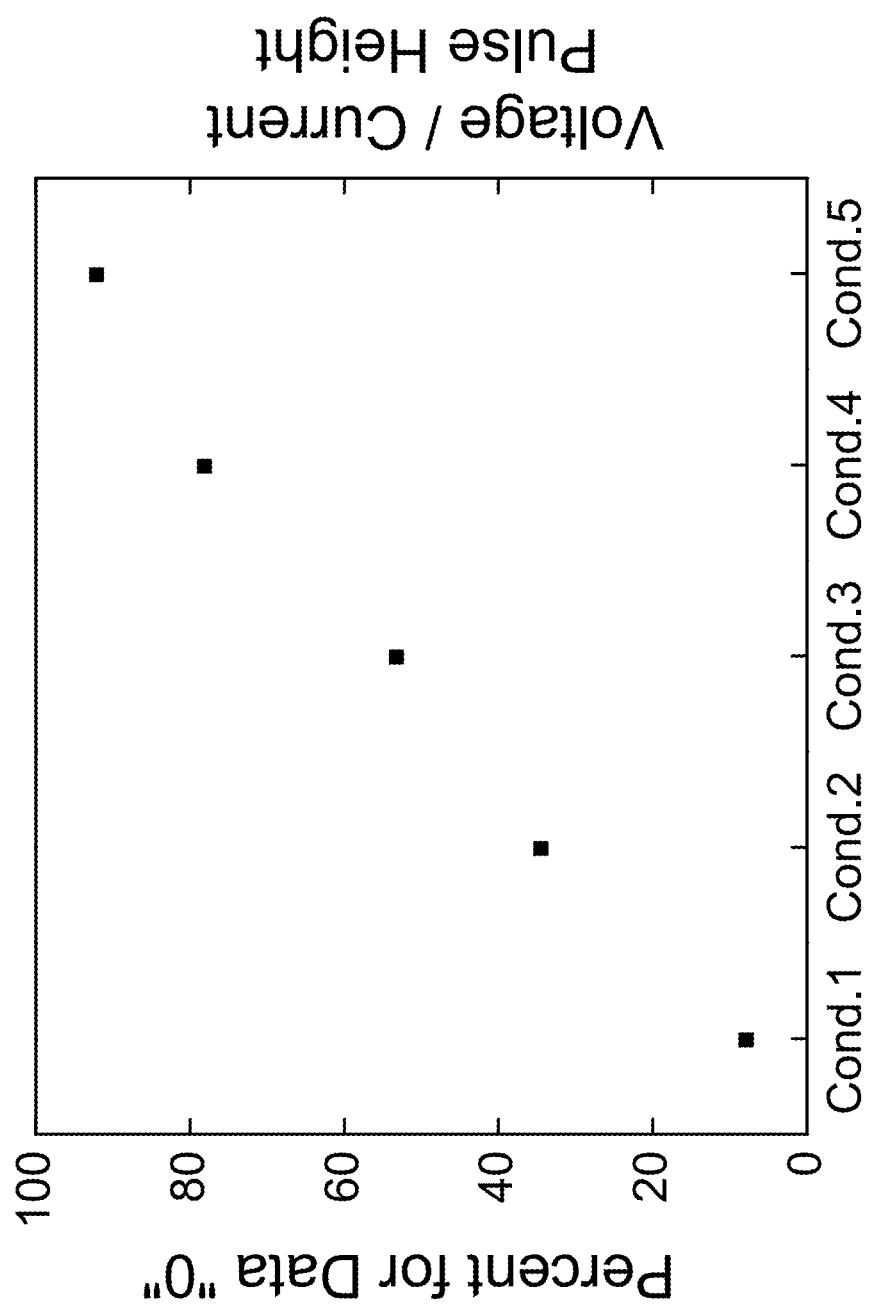
FIG. 8 illustrates different conditions for finding a forming pulse level.

FIG. 8 illustrates different conditions for finding a forming pulse level, which in turn can control the randomness of a data set. The conditions can include heights of voltage and/or current pulses applied to a set of the programmable resistance memory cells used for generating the data set. Randomness of the data set relates to a proportion of the memory cells in the test set that have resistance in the intermediate resistance range. As shown in the example of FIG. 8, conditions 1, 2, 3, 4 and 5 result in data "0", corresponding to the intermediate resistance range, having about 10%, about 30%, about 50%, about 80% and about 90%, of the memory cells in the test set, respectively. The forming pulse level can be adjusted according to design specifications of particular integrated circuits that use the technology as described herein.

FIGS. 9-13 illustrate operations to find a forming pulse level. To find the forming pulse level, a test pulse having a test pulse level can be iteratively applied to a test set of the programmable resistance memory cells on the same integrated circuit, and preferably having the same structure as the memory cells to be used to create the unique data set. For each iteration, a different test set of the programmable resistance memory cells than previously used test set(s) can be used. A proportion of the memory cells in the test set can be determined that have resistance in the intermediate resistance range. If the proportion is less than a threshold, then the test pulse level can be updated repeating the operations to apply the test pulse and determine the proportion until the determined proportion satisfies the threshold, and the forming pulse level can be set based on the test pulse level in the iteration that satisfies the threshold.

An empirically determined resistance threshold 905 can be used to determine if a memory cell has resistance less than the resistance threshold and in the intermediate resistance range. As shown in the examples of FIGS. 9-13, the resistance threshold 905 is about 700 KOhm. Because the first and second final resistance ranges are separated by a wide read margin 745 (FIG. 7C), the resistance threshold 905 can be within the wide margin, and serve the purpose of determining which memory cells are in the intermediate resistance range. For instance, the resistance threshold can be 800 KOhm, 900 KOhm, and 1000 KOhm, instead of 700 KOhm. One benefit of having a wide margin is that it is less likely the resistance of any memory cell may drift across the margin due to PVT (process, voltage, temperature) conditions and consequently cause reliability issues.

Figure 9:
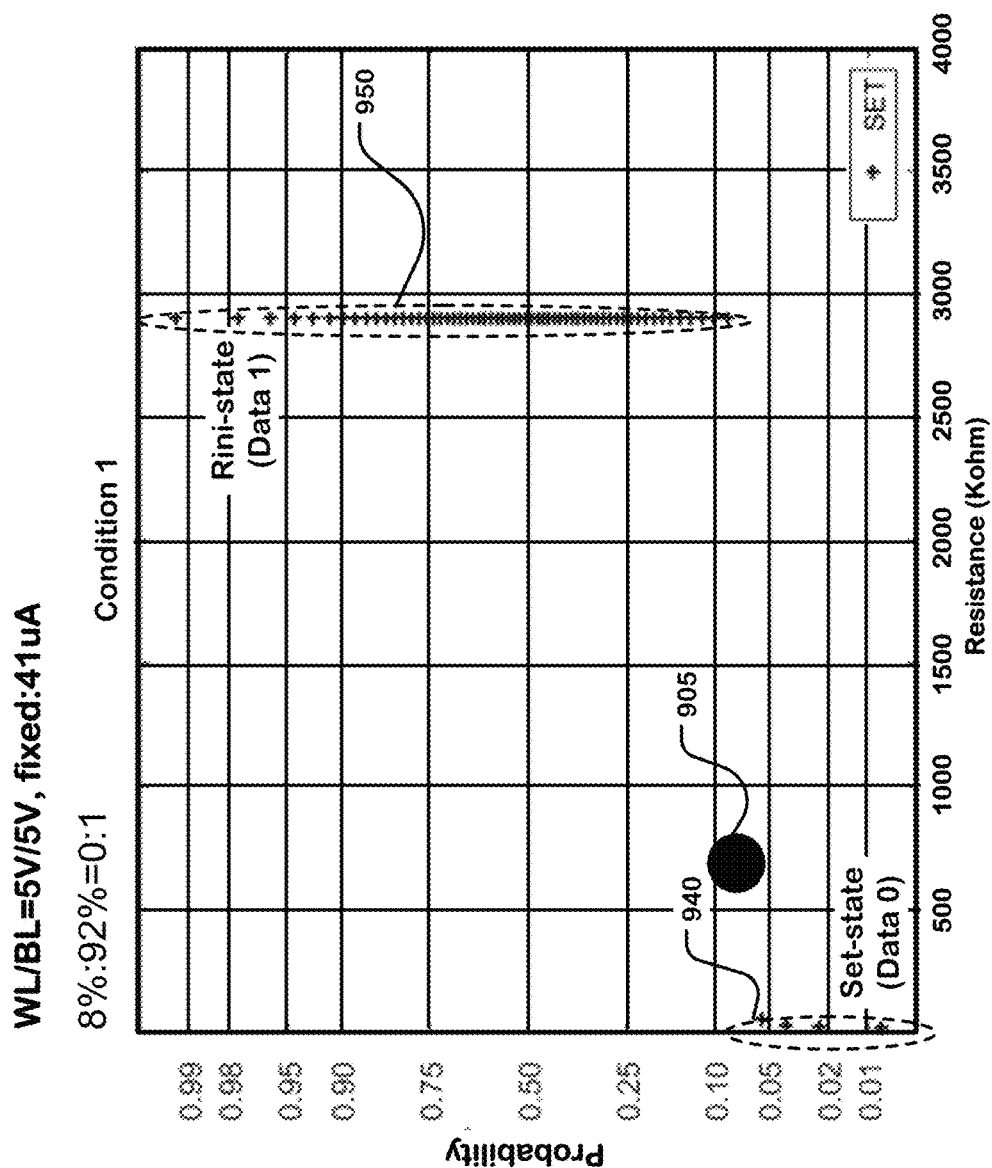
FIGS. 9-13 illustrate operations to find a forming pulse level.

FIG. 9 illustrates an example condition 1 for finding a forming pulse level. Condition 1 includes applying a word line voltage of 5V, a bit line voltage of 5V, and a current of 41 µA to a test set of the programmable resistance memory cells. Condition 1 results in 8% of the memory cells in the test set in the set state or having data "0" (e.g. 940), and 92% of the memory cells in the test set in the initial resistance state or having data "1" (e.g. 950).

Figure 10:
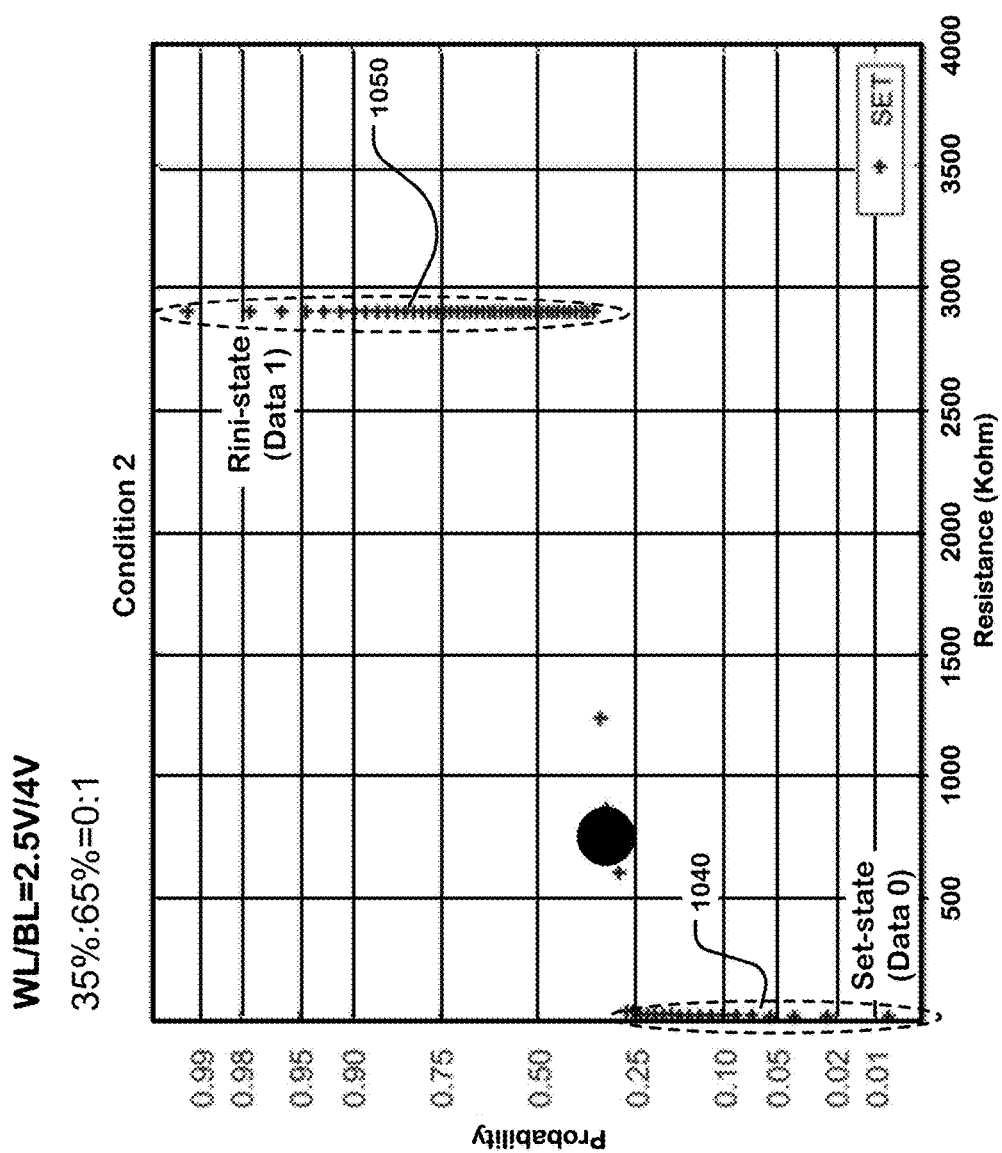

FIG. 10 illustrates an example condition 2 for finding a forming pulse level. Condition 2 includes applying a word line voltage of 2.5V, and a bit line voltage of 4V to a test set of the programmable resistance memory cells. Condition 2 results in 35% of the memory cells in the test set in the set state or having data "0" (e.g. 1040), and 65% of the memory cells in the test set in the initial resistance state or having data "1" (e.g. 1050).

FIG. 11 illustrates an example condition 3 for finding a forming pulse level. Condition 3 includes applying a word line voltage of 4V, and a bit line voltage of 4V to a test set of the programmable resistance memory cells. Condition 3 results in 53% of the memory cells in the test set in the set state or having data "0" (e.g. 1140), and 47% of the memory cells in the test set in the initial resistance state or having data "1" (e.g. 1150).

Figure 12:
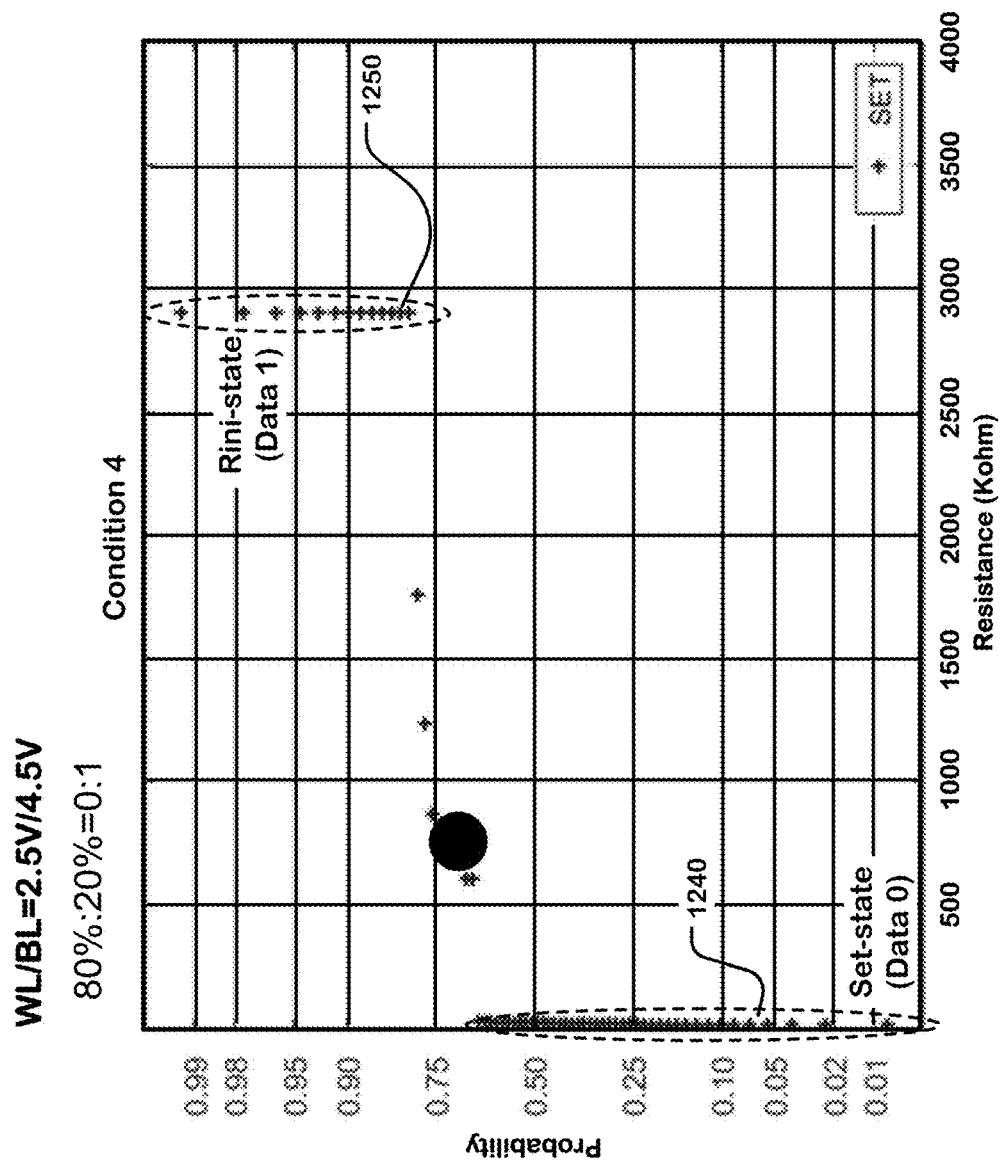

FIG. 12 illustrates an example condition 4 for finding a forming pulse level. Condition 4 includes applying a word line voltage of 2.5V, and a bit line voltage of 4.5V to a test set of the programmable resistance memory cells. Condition 4 results in 80% of the memory cells in the test set in the set state or having data "0" (e.g. 1240), and 20% of the memory cells in the test set in the initial resistance state or having data "1" (e.g. 1250).

Figure 13:
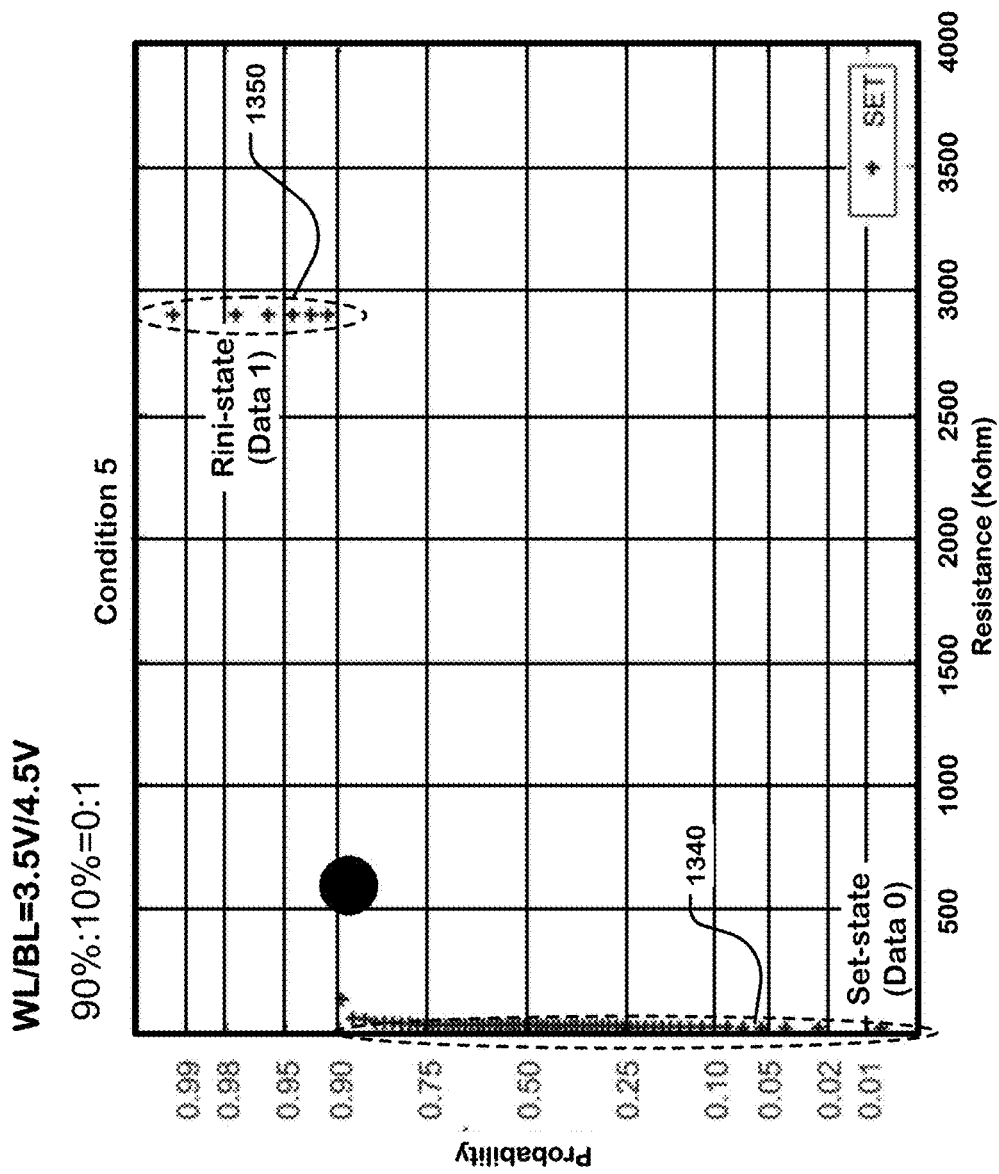

FIG. 13 illustrates an example condition 5 for finding a forming pulse level. Condition 5 includes applying a word line voltage of 3.5V, and a bit line voltage of 4.5V to a test set of the programmable resistance memory cells. Condition 5 results in 90% of the memory cells in the test set in the set state or having data "0" (e.g. 1340), and 10% of the memory cells in the test set in the initial resistance state or having data "1" (e.g. 1350).

For instance, if a desirable threshold for a proportion of the memory cells in the test set is about 50% or more preferably within a specified range around 50% (e.g. 40% to 60%), then the forming pulse level can be set based on the test pulse level used in the iteration that satisfies the threshold or falls within the specified range (e.g. condition 3, FIG. 10), or more preferably falls within the specified range.

Figures 14A, 14B, 14C:
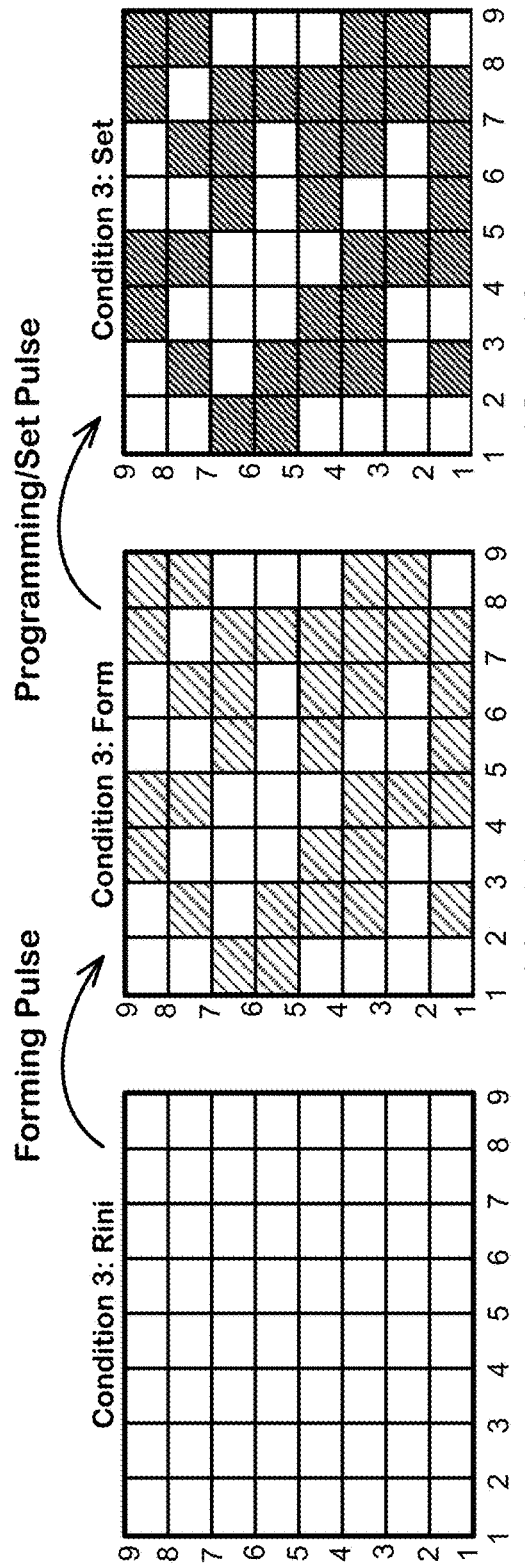
FIGS. 14A, 14B and 14C illustrate example results of applying test pulses in a test set.

FIGS. 14A, 14B and 14C illustrate results of applying test pulses in a test set, using condition 3 as described in connection to FIG. 11. In the example of FIG. 14A, memory cells in the test set are in an initial resistance range of greater 3 MOhm. In the example of FIG. 14B, after a test pulse corresponding to condition 3 is applied, a first subset of the test set is changed to an intermediate resistance range or in the form state. In the example of FIG. 14C, after a programming/set pulse is applied, the first subset is changed from the intermediate resistance range to a first final resistance range of less than 50 Kohm.

Figures 15A, 15B:
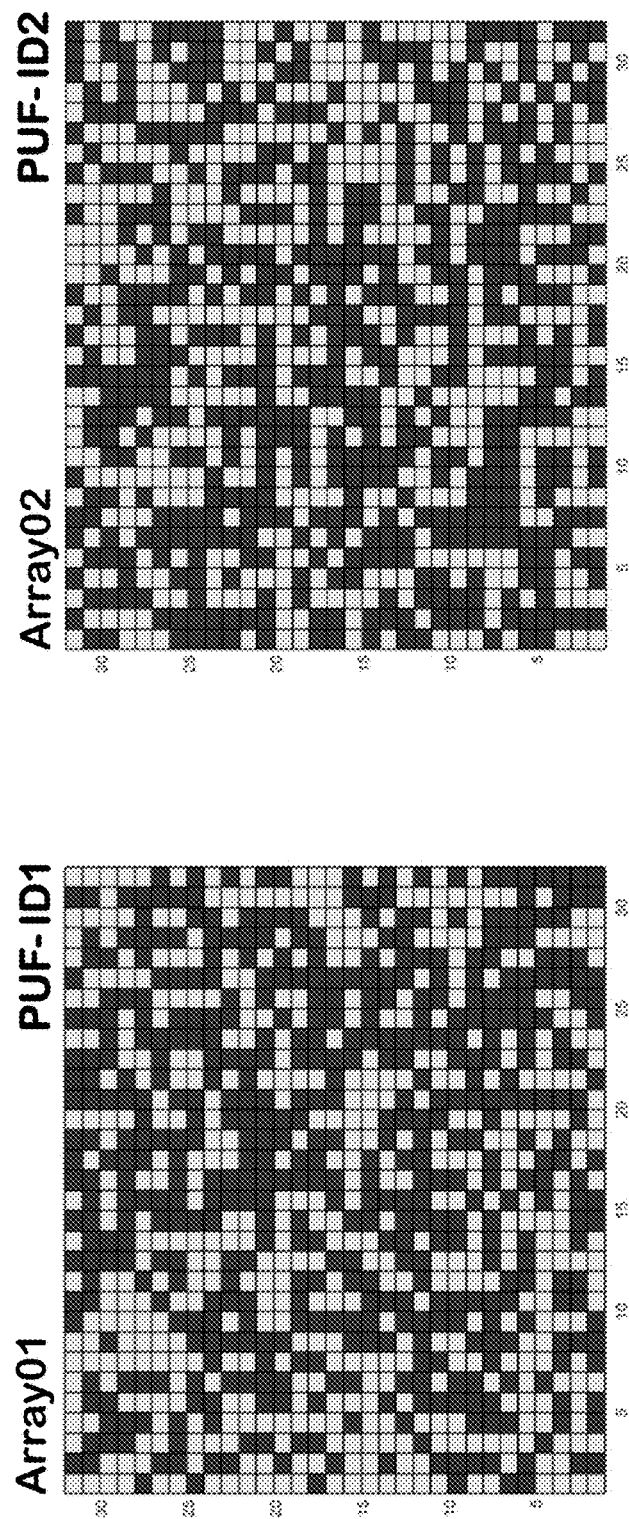
FIGS. 15A and 15B illustrate results of generating a first data set in a first PUF ID array and a second data set in a second PUF ID array.

FIGS. 15A and 15B illustrate results of generating a first data set (PUF-ID1) in a first PUF ID array and a second data set (PUF-ID2) in a second PUF ID array. As shown in FIGS. 15A and 15B, the present technology exhibits high uniqueness and unpredictable characteristics between the first PUF ID array (e.g. Array01) and the second PUF ID array (e.g. Array02), where each PUF ID array includes 1K bits. In this example, the first PUF ID array and the second PUF ID array have WOx (tungsten oxide) based programmable resistance memory cells with initial resistance in a high resistance range.

Reliability testing has been done on the data set generated by the present technology under various conditions (e.g., before baking, baking at 250° C. for 0.25 hr, and baking at 250° C. for 65 hours, respectively). The reliability testing uses 1K memory cells in a PUF ID array before baking, after baking for 0.25 hours at 250° C., and after baking for 65 hours at 250° C. In comparison, the resistance states of the 1K memory cells in the PUF ID array after baking under two different conditions are consistent with the resistance states of the 1K memory cells in the PUF ID array before baking. Consequently, the data set generated by the present technology exhibits BER (bit error rate) free performance (BER=0.00%) under high temperature (250° C.) baking conditions, and can be applicable to IoT (Internet of Things) products and security chips.

Figure 16:
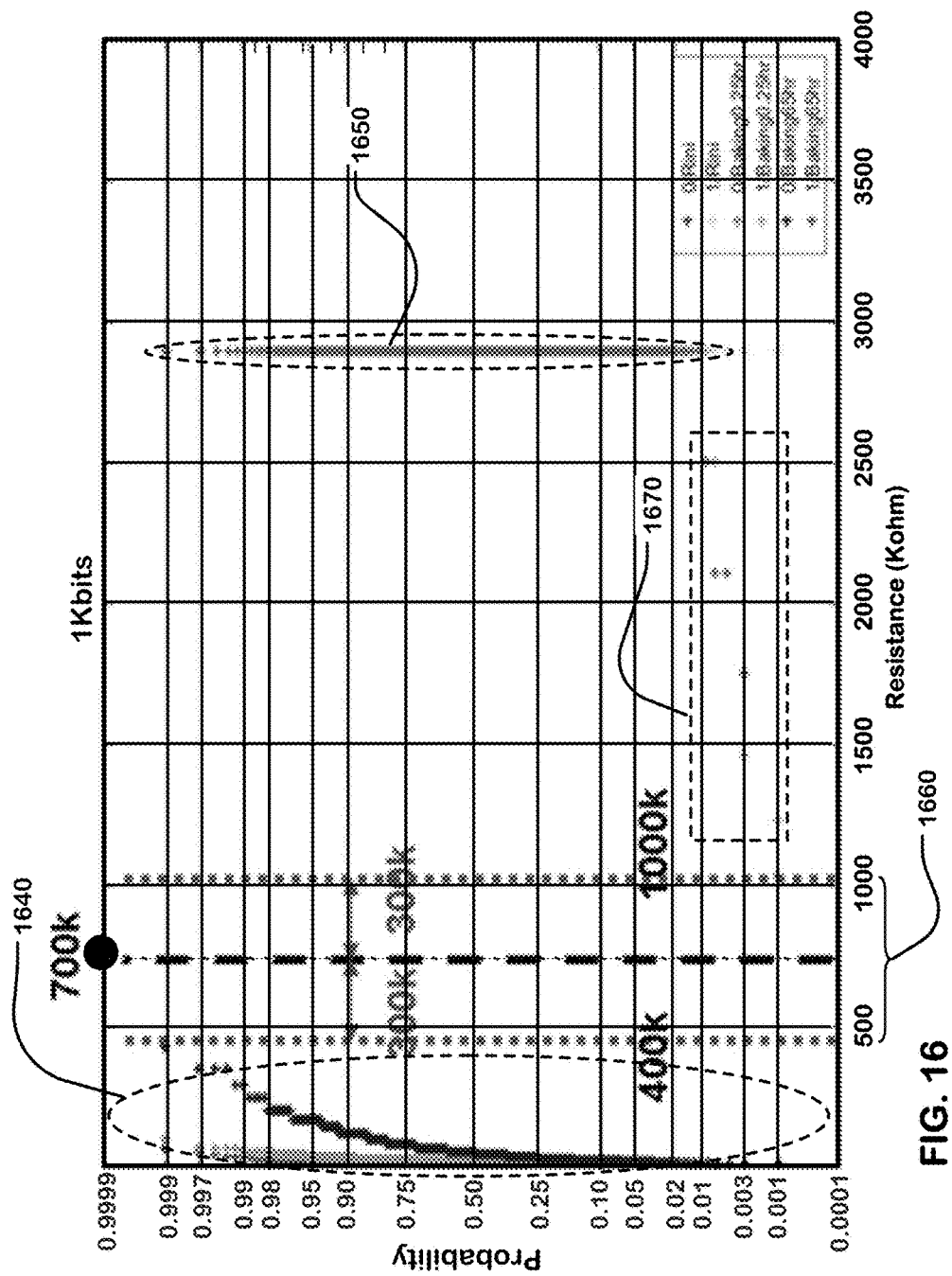
FIG. 16 illustrates a read margin between example first and second final resistance ranges under high temperature baking conditions.

FIG. 16 illustrates a read margin 1660 between a first final resistance range (e.g. 1640) and a second final resistance range (e.g. 1650) under high temperature baking conditions (e.g. 250° C.). In this example, the read margin 1660 is between 400 KOhm and 1000 KOhm, i.e., supporting a sensing resistance threshold at 700 KOhm+/−300 KOhm. The read margin 1660 is wide enough to separate the first and second final resistance ranges, even in the presence of a few tail bits (e.g. 1670) which can be induced under high temperature baking conditions (e.g. 250° C.).

The present technology can be implemented in devices where memory cells have initial resistance in a high resistance range and are then formed to a lower intermediate range, including transition-metal-oxide devices (WOx based programmable resistance memories, Ta2O5 based programmable resistance memories, HfO2 based programmable resistance memories, TiON based programmable resistance memories, TiOx based programmable resistance memories), conduction filament programmable resistance memories (Cu-based, Ag-based), phase change memory, and anti-fuse devices (MOS or MIM structures, with dielectric breakdown as anti-fuse cell).

The present technology can be implemented in technologies where memory cells have initial resistance in a low resistance range and are then formed to a higher intermediate range, including initial low resistance metal oxide memories such as WOx programmable resistance memories, and fuse devices such as metal fuse, polysilicon fuse and contact fuse.

While the present technology is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A method for generating a data set on an integrated circuit including programmable resistance memory cells, comprising:
    applying a forming pulse to all members of a set of the programmable resistance memory cells, the forming pulse having a forming pulse level characterized by inducing a change in resistance in a first subset of the set of programmable resistance memory cells from an initial resistance range to an intermediate resistance range, while after the forming pulse a second subset of the set of programmable resistance memory cells has a resistance outside the intermediate resistance range; and
    applying a programming pulse to the first and second subsets of programmable resistance memory cells, the programming pulse having a programming pulse level characterized by inducing a change in resistance of the first subset from the intermediate resistance range to a first final resistance range, while after the programming pulse the second subset of programmable resistance memory cells has a resistance in a second final resistance range that does not overlap the first final resistance range, whereby the first and second subsets of the set of programmable memory cells store said data set.

2. The method of claim 1, including prior to applying the forming pulse, finding the forming pulse level by testing some of the programmable resistance memory cells on the integrated circuit.

3. The method of claim 1, including prior to applying the forming pulse, finding the forming pulse level by a method comprising:
    iteratively applying a test pulse having a test pulse level to a test set of the programmable resistance memory cells, and determining a proportion of the memory cells in the test set that have resistance in the intermediate resistance range, and if the proportion is less than a threshold updating the test pulse level repeating said applying the test pulse and determining on a different test set until the determined proportion satisfies the threshold, and setting the forming pulse level based on the test pulse level in an iteration that satisfies the threshold.

4. The method of claim 1, including sensing the data set using a read voltage for a resistance between the first and second final resistance ranges, and wherein the first and second final resistance ranges are separated by a read margin which is greater than a margin between the initial resistance range and the intermediate resistance range.

5. The method of claim 1, wherein the programmable resistance memory cells comprise programmable metal oxide memory elements.

6. The method of claim 1, wherein the programmable resistance memory cells comprise programmable resistance memory elements characterized by an initial resistance in a high resistance range, and wherein the intermediate resistance range is lower than the high resistance range, the first final resistance range is lower than the intermediate resistance range, and the second final resistance range is higher than the first final resistance range.

7. The method of claim 1, wherein the programmable resistance memory cells comprise programmable resistance memory elements characterized by an initial resistance in a low resistance range, and wherein the intermediate resistance range is higher than the low resistance range, the first final resistance range is higher than the intermediate resistance range, and the second final resistance range is lower than the first final resistance range.

8. The method of claim 1, wherein the programmable resistance memory cells comprise programmable resistance memory elements, and said applying the forming pulse results in formation of a conductive filament connecting first and second electrodes of memory cells in the first subset, and fails to result in formation of a conductive filament connecting first and second electrodes of memory cells in the second subset.

9. The method of claim 8, wherein the programming pulse stabilizes and enhances conductivity of the conductive filament of memory cells in the first subset, and fails to result in formation of a conductive filament in memory cells in the second subset.

10. A method of manufacturing an integrated circuit, comprising:
forming a plurality of programmable resistance memory cells on the integrated circuit;
connecting the integrated circuit to a system configured to apply a physical unclonable function to programmable resistance memory cells on the integrated circuit, and using the system, to generate a data set in a set of programmable resistance memory cells in the plurality of programmable resistance memory cells, by:
applying a forming pulse to all members of the set, the forming pulse having a forming pulse level characterized by inducing a change in resistance in a first subset of the set of programmable resistance memory cells from an initial resistance range to an intermediate resistance range, while after the forming pulse a second subset of the set of programmable resistance memory cells has a resistance outside the intermediate resistance range; and
applying a programming pulse to the first and second subsets of programmable resistance memory cells, the programming pulse having a programming pulse level characterized by inducing a change in resistance of the first subset from the intermediate resistance range to a first final resistance range, while after the programming pulse the second subset of programmable resistance memory cells has a resistance in a second final resistance range that does not overlap the first final resistance range, whereby the first and second subsets of the set of programmable memory cells store said data set.

11. The method of claim 10, including prior to applying the forming pulse, finding the forming pulse level by testing some of the programmable resistance memory cells on the integrated circuit.

12. The method of claim 10, including prior to applying the forming pulse, finding the forming pulse level by a method comprising:
iteratively applying a test pulse having a test pulse level to a test set of the programmable resistance memory cells, and determining a proportion of the memory cells in the test set that have resistance in the intermediate resistance range, and if the proportion is less than a threshold updating the test pulse level repeating said applying the test pulse and determining on a different test set until the determined proportion satisfies the threshold, and setting the forming pulse level based on the test pulse level in an iteration that satisfies the threshold.

13. The method of claim 10, including sensing the data set using a read voltage for a resistance between the first and second final resistance ranges, and wherein the first and second final resistance ranges are separated by a read margin which is greater than a margin between the initial resistance range and the intermediate resistance range.

14. The method of claim 10, wherein the programmable resistance memory cells comprise programmable metal oxide memory elements.

15. An apparatus, comprising:
a plurality of programmable resistance memory cells; and
a controller configured, to generate a data set in a set of programmable resistance memory cells in the plurality of programmable resistance memory cells, by a procedure including:
applying a forming pulse to all members of the set, the forming pulse having a forming pulse level characterized by inducing a change in resistance in a first subset of the set of programmable resistance memory cells from an initial resistance range to an intermediate resistance range, while after the forming pulse a second subset of the set of programmable resistance memory cells has a resistance outside the intermediate resistance range; and
applying a programming pulse to the first and second subsets of programmable resistance memory cells, the programming pulse having a programming pulse level characterized by inducing a change in resistance of the first subset from the intermediate resistance range to a first final resistance range, while after the programming pulse the second subset of programmable resistance memory cells has a resistance in a second final resistance range that does not overlap the first final resistance range, whereby the first and second subsets of the set of programmable memory cells store said data set.

16. The apparatus of claim 15, wherein the procedure includes prior to applying the forming pulse, finding the forming pulse level by testing some of the programmable resistance memory cells in the plurality of programmable memory cells.

17. The apparatus of claim 15, wherein the procedure includes prior to applying the forming pulse, finding the forming pulse level by a method comprising:
iteratively applying a test pulse having a test pulse level to a test set of the programmable resistance memory cells, and determining a proportion of the memory cells in the test set that have resistance in the intermediate resistance range, and if the proportion is less than a threshold updating the test pulse level repeating said applying the test pulse and determining on a different test set until the determined proportion satisfies the threshold, and setting the forming pulse level based on the test pulse level in an iteration that satisfies the threshold.

18. The apparatus of claim 15, including sensing circuits which sense the data set using a read voltage for a resistance between the first and second final resistance ranges, and wherein the first and second final resistance ranges are separated by a read margin which is greater than a margin between the initial resistance range and the intermediate resistance range.

19. The apparatus of claim 15, wherein the programmable resistance memory cells in the plurality comprise programmable metal oxide memory elements.

* * * * *